United States Patent [19]

Inoue et al.

[11] Patent Number: 5,313,235
[45] Date of Patent: May 17, 1994

[54] SOUND PLAYBACK APPARATUS CAPABLE OF PLAYING BACK SOUNDS RELEVANT TO PHOTOGRAPHS

[75] Inventors: Manabu Inoue; Nobuyuki Taniguchi; Hiroshi Ueda; Yujiro Mima; Masakazu Yagi; Masayasu Hirano, all of Azuchi, Japan

[73] Assignee: Minolta Camera Kabushiki Kaisha, Osaka, Japan

[21] Appl. No.: 843,720

[22] Filed: Feb. 28, 1992

Related U.S. Application Data

[62] Division of Ser. No. 525,965, May 11, 1990, Pat. No. 5,128,700.

[30] Foreign Application Priority Data

| May 12, 1989 | [JP] | Japan | 1-119362 |
| May 12, 1989 | [JP] | Japan | 1-119363 |
| May 12, 1989 | [JP] | Japan | 1-119364 |
| May 12, 1989 | [JP] | Japan | 1-119365 |
| May 12, 1989 | [JP] | Japan | 1-119366 |

[51] Int. Cl.⁵ .............................................. G03B 29/00
[52] U.S. Cl. ........................................ 354/76; 40/455; 360/2

[58] Field of Search ................ 354/75, 76; 360/2; 40/455; 353/19; 358/909; 369/63, 68

[56] References Cited

U.S. PATENT DOCUMENTS

| 4,344,682 | 8/1982 | Hattori | 354/62 |
| 4,500,183 | 2/1985 | Tanikawa | 354/21 |
| 4,725,897 | 2/1988 | Konishi | 360/10.1 |
| 4,728,978 | 3/1988 | Inoue et al. | 354/289.1 |
| 4,742,369 | 5/1988 | Ishii et al. | 354/441 |
| 4,905,029 | 2/1990 | Kelley | 354/76 |

FOREIGN PATENT DOCUMENTS 62-116932  5/1987  Japan .

Primary Examiner—Michael L. Gellner
Assistant Examiner—Howard B. Blankenship
Attorney, Agent, or Firm—Burns, Doane, Swecker & Mathis

[57] ABSTRACT

In a sound playback apparatus, by attaching thereto a medium in which sound data are recorded in each area thereof and a print in each frame of which a code indicating a sound recording area is recorded, the sound playback apparatus can play back sound data corresponding to the photographed frames of the film respectively from the medium.

1 Claim, 24 Drawing Sheets

PRE-AND-POST-RELEASE RECORDING MODE

MANUAL RECORDING MODE

PRE-RELEASE RECORDING MODE

NON-RECORDING MODE

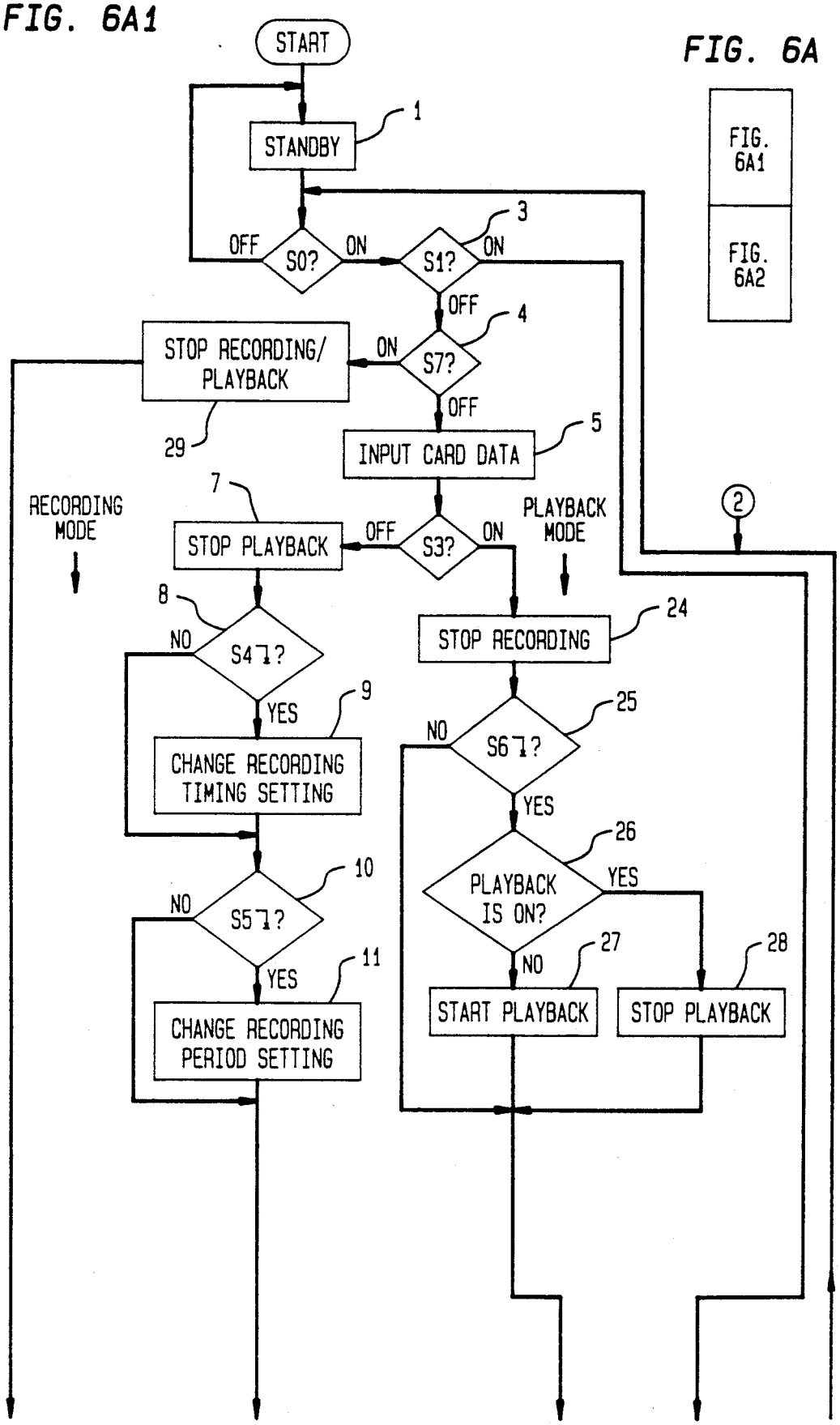

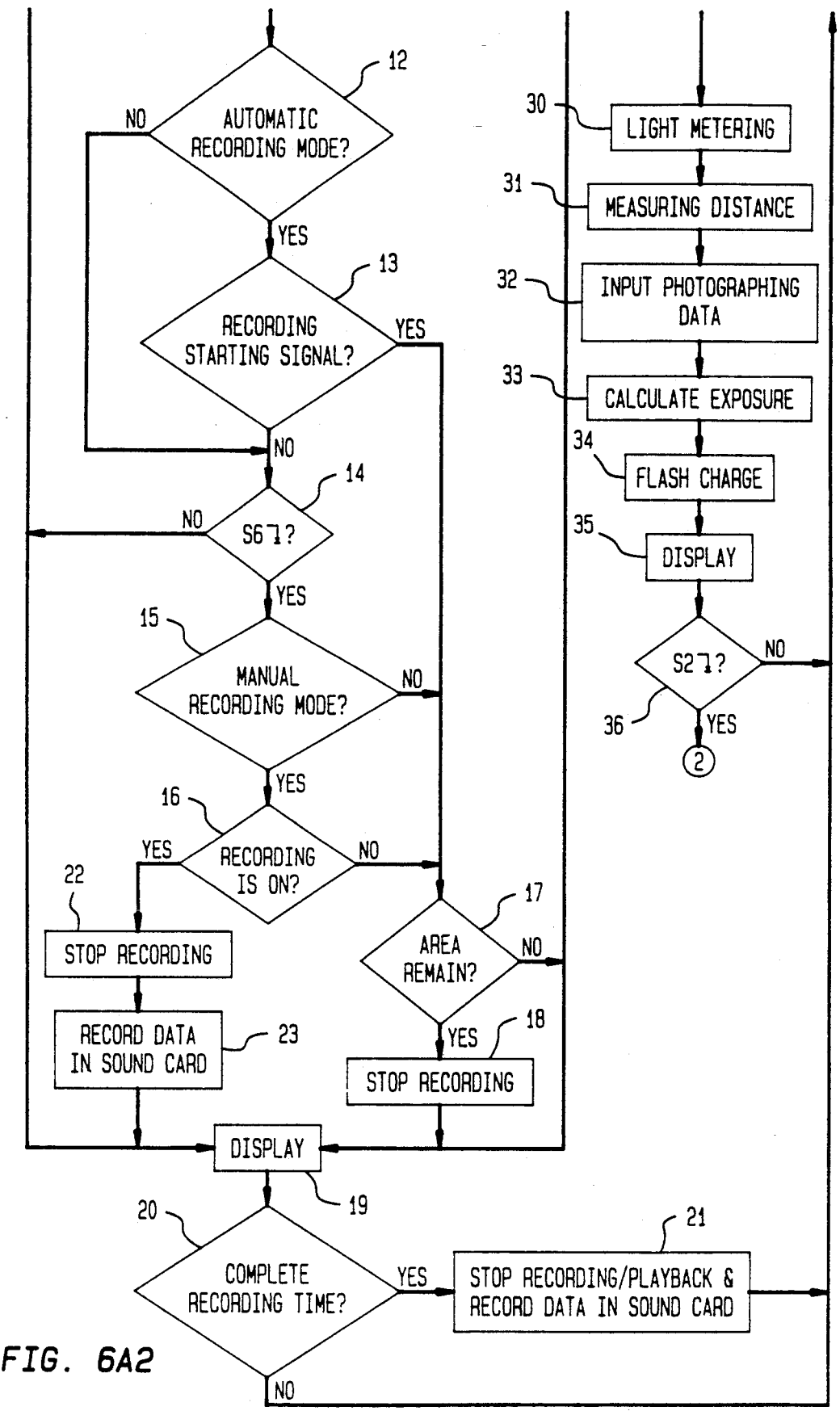
FIG. 6A2

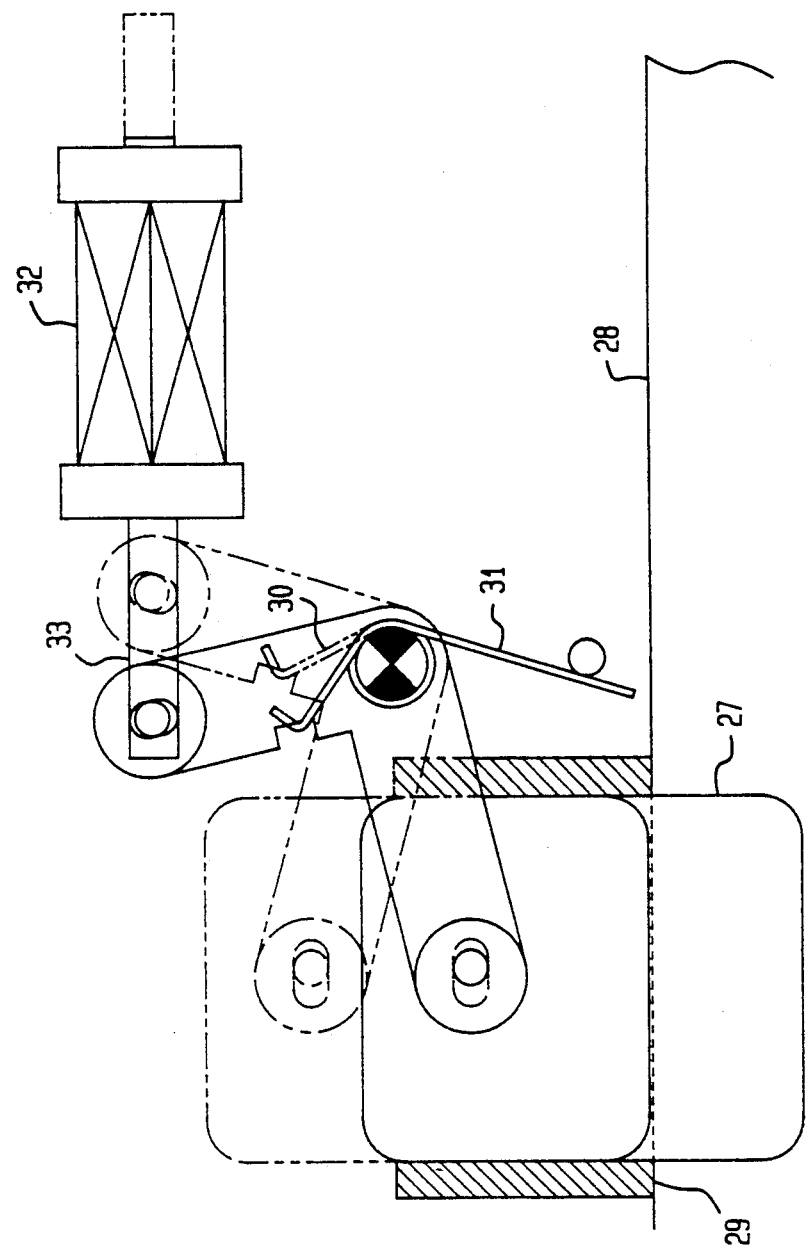
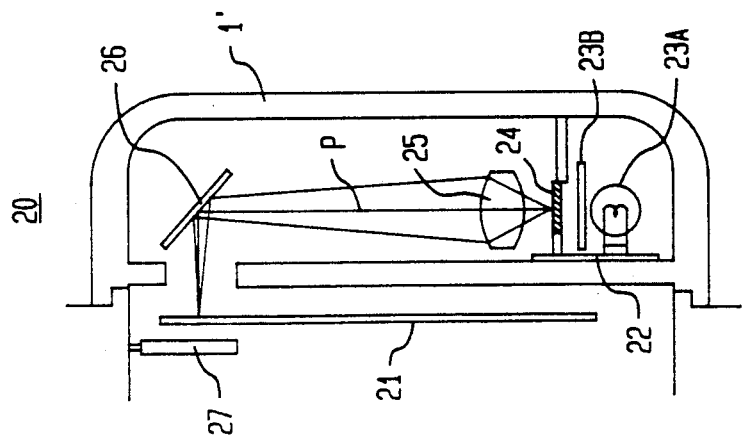
FIG. 9
FIG. 8

1 0 1 0 1 0 1 0 0

SOUND CARD MEMORY

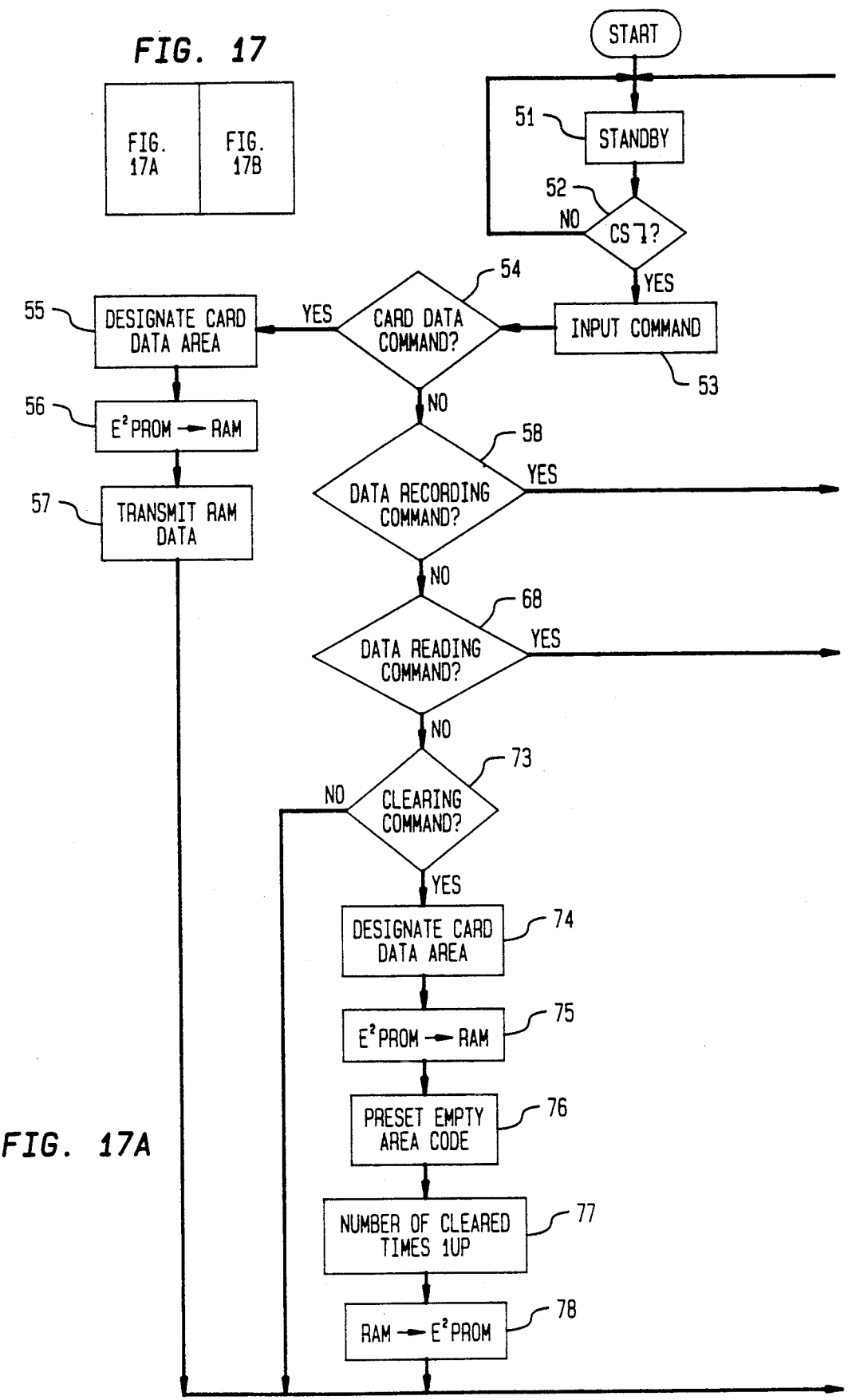

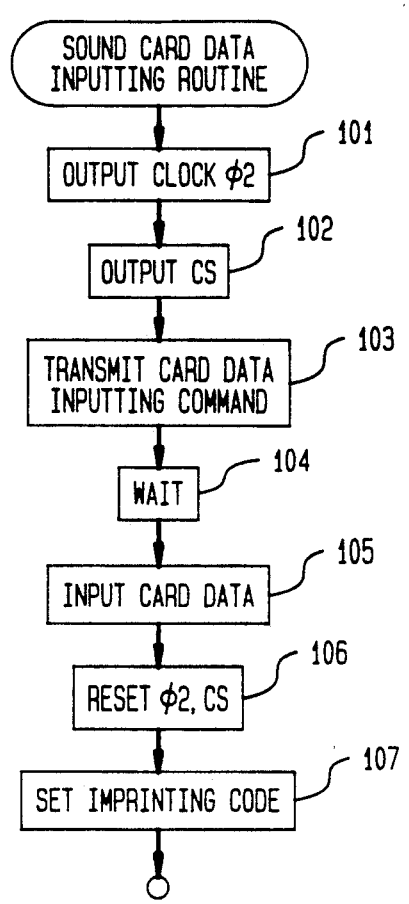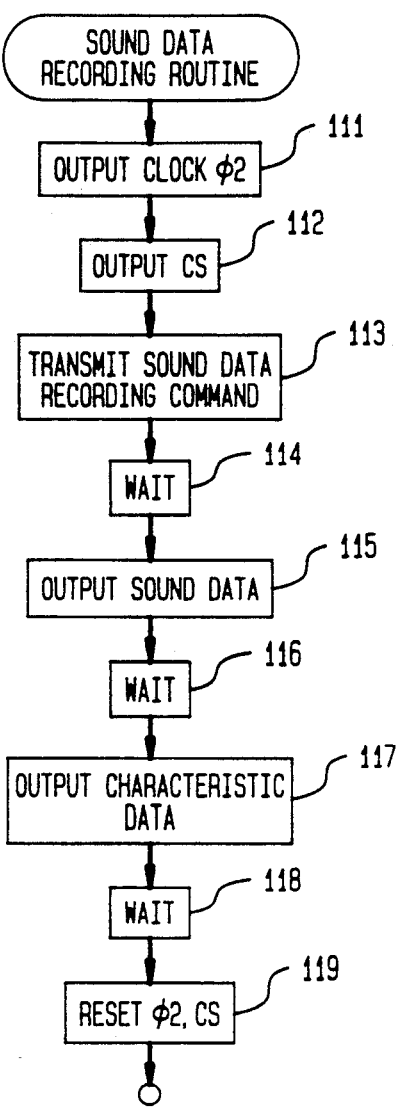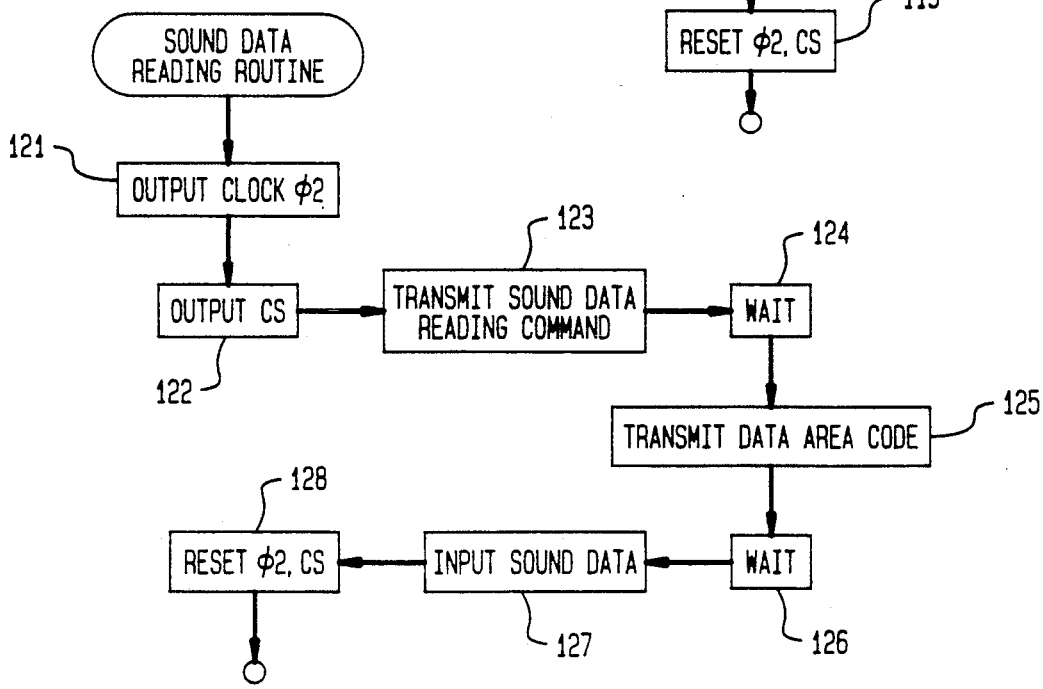

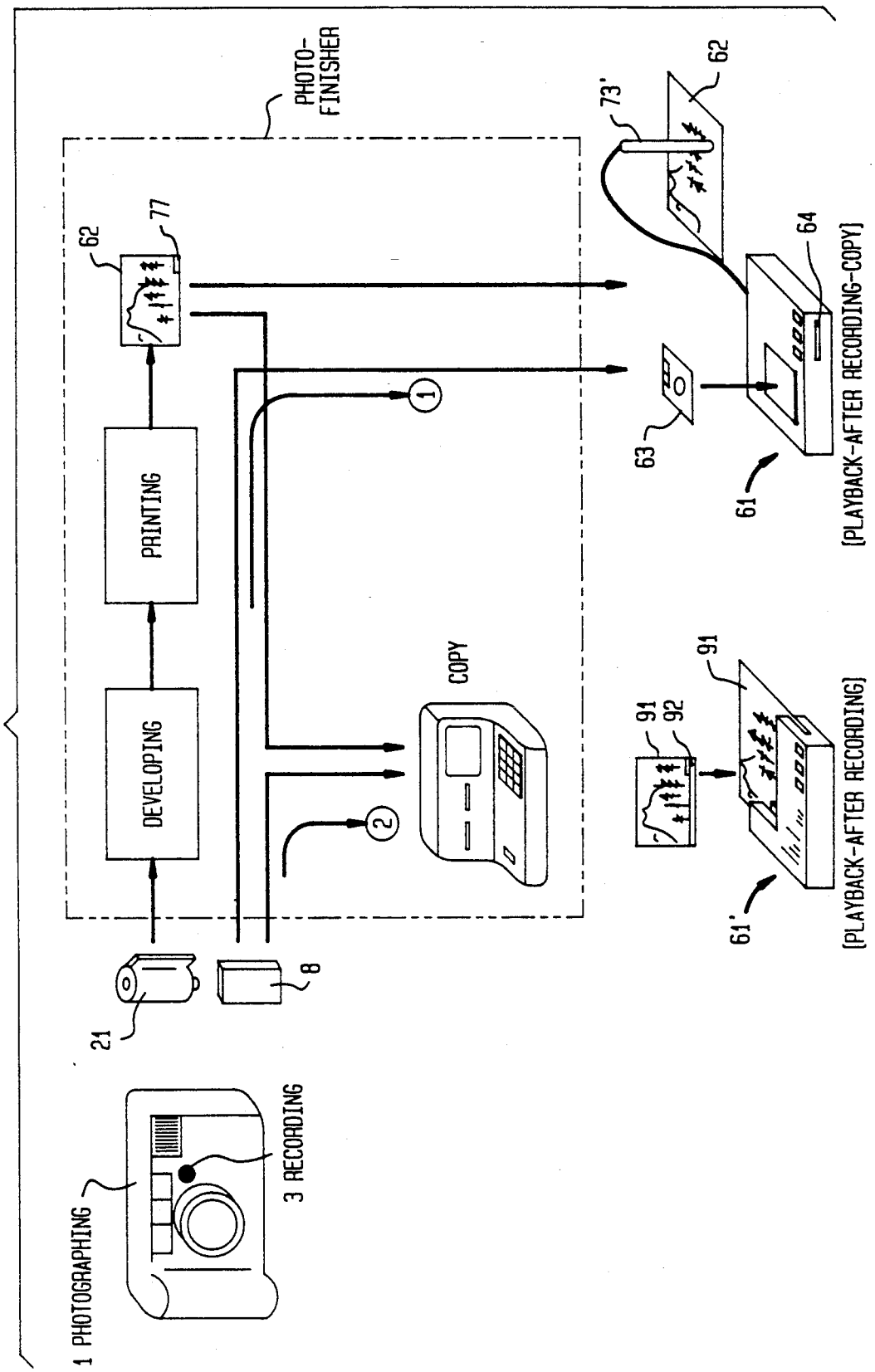

SOUND PLAYBACK APPARATUS CAPABLE OF PLAYING BACK SOUNDS RELEVANT TO PHOTOGRAPHS

This application is a divisional of application Ser. No. 07/525,965, filed May 11, 1990 now U.S. Pat. No. 5,128,700.

BACKGROUND OF THE INVENTION

The present invention relates to a data recording camera capable of photographing an object image frame by frame of a film and capable of recording sound data corresponding to the photographing.

In camera for photographing optical images on a usual silver halide film, there are ones capable of also recording related data such as sounds in connection with the photographed frames (for example, Japanese Laid-Open Patent Publication No. 62-116932). In a camera disclosed in this Laid-Open Publication, a semiconductor memory is used for storing related data.

Further, there is a camera provided with an IC card as a recording medium in which photographing data are recorded (for example, U.S. Pat. No. 4,728,978). In this camera, data used in photo laboratory are recorded in the IC card, and when they are recorded therein, a mark indicating completion of the data recording is imprinted in the film. However, this camera is not constituted to record sounds.

For recording sounds in a recording means, it is required much recording capacity. Therefore, the capacity of a memory attached to a film or film cartridge is insufficient. As a result, a memory for recording sounds is required independently. In this case, since the memory for recording sounds and a film are separate, it is sometimes difficult to recognize the photographed frames and the recorded sounds in accurate correspondence. And when the sounds are played back or copied in another medium, sometimes the sounds cannot correspond to the photographed frames respectively, thereby causing errors. In the above-mentioned Laid-Open Publication, nothing is disclosed relating to recording data for corresponding photographed frames to recorded sounds.

Taking of the capacity of a semiconductor memory, sounds relating to photographed frames of one film (the recording time being regarded as 10 sec. for each one frame) can be recorded in a semiconductor now used at most on the practical level. Therefore, in order to take a longer sound recording time, to optionally set the recording timing, and further to record sounds relating to a plurality of films, another sound recording memory is required than the above-mentioned semiconductor memory.

In this case, the sound recording memory is, as shown in U.S. Pat. No. 4,728,978, in the form of a card, and it is attached to a camera in such a manner that it can be easily exchanged by another one. And it is preferable in respects of reliability and simplification of the structure that electrical contact points of the sound recording card of this type and the camera are as small as possible in number. To satisfy this necessity, it is preferable to use a serial communication for the data communication between the camera and the sound recording memory card. On the other hand, as a sound recording memory card of this type, a semiconductor memory is used and accordingly, it is necessary to convert sound signals to digital ones and code them in order to record sounds in the memory card. And for transmitting data from a camera to the memory card through a serial communication simultaneously with converting sound signals to digital ones and coding them, extremely complicate control has to be executed in respect of timing.

While, it is conventionally known that in a sound recording camera, timing of starting image recording and timing of starting sound recording are optionally shifted (it is disclosed in the Japanese Laid-Open Patent Publication No. 61-133780 and 61-253981). Though timing setting for sound recording to image recording is difficult, there is no proposition to display timing for sound recording. Only a few disclosure can be related. For example, in Japanese Laid-Open Patent Publication No. 61-257087, remaining time for sound recording is displayed, and in Japanese Laid-Open Patent Publication No. 61-277281, lapse time for sound recording and lamp to be indicated "on recording" are displayed.

In this way, in conventionally, since the timing settings of sound recording and image recording are not displayed, the relation between these timings are hard to confirm and it is inconvenient.

SUMMARY OF THE INVENTION

An object of the present invention is to provide a data recording camera in which correspondence between photographed frames and recorded sounds are capable to recognize apparently and the above-mentioned errors caused in sound playback and sound copying can be provided. According to the present invention, in a camera using a silver halide film, sounds can be recorded, and sound data storing areas and photographed frames are put in accurate correspondence. Then, even if a first memory means, namely, a sound memory and a second memory, namely, a photographed film are separated, errors in corresponding them at the time of sound playback, sound copying in another medium and the like can be prevented.

Another object of the present invention is to provide a sound recording camera in which inputted sound data are once stored in a semiconductor memory contained in the camera body and later the sound data are successively transmitted to a sound recording medium attached to the camera, so that the data transmission can be easily executed, and the camera has a simplified structure, and is easily controlled and operated with a high reliability.

A further object of the present invention is to provide a sound recording camera in which a sound recording timing mode in relation to image recording timing can be displayed so as to be easily confirmed, and therefore photographing and sound recording at an adequate timing can be executed.

A further object of the present invention is to provide a sound playback apparatus in which correspondence between photographed frames and recorded sounds capable to recognize apparently, easily detect corresponding photographed frames and recorded sounds in sound playback, and easily and accurately play back sounds corresponding to the photographed frames, and further requires only a small-sized and inexpensive recording medium.

BRIEF DESCRIPTION OF THE DRAWINGS

FIG. 6(a), 6A1, 6A2, and 6(b) are flow charts showing operation of a microcomputer of the camera;

FIG. 8 is a structural view of an imprinting device for imprinting a code in a film loaded in the camera;

FIG. 9 is a structural view of a light shielding plate of the imprinting device;

FIG. 17, 17A, and 17B is a flow chart showing operation of a microcomputer provided in the sound card;

FIGS. 18 to 20 are flow charts showing operations of various kinds of devices and apparatus communicating with the sound card;

FIG. 31 is a view showing routes of flow of a film and a sound card including a photofinisher and embodiment in use thereof.

DETAILED DESCRIPTION OF THE PREFERRED EMBODIMENTS

Figure 1:
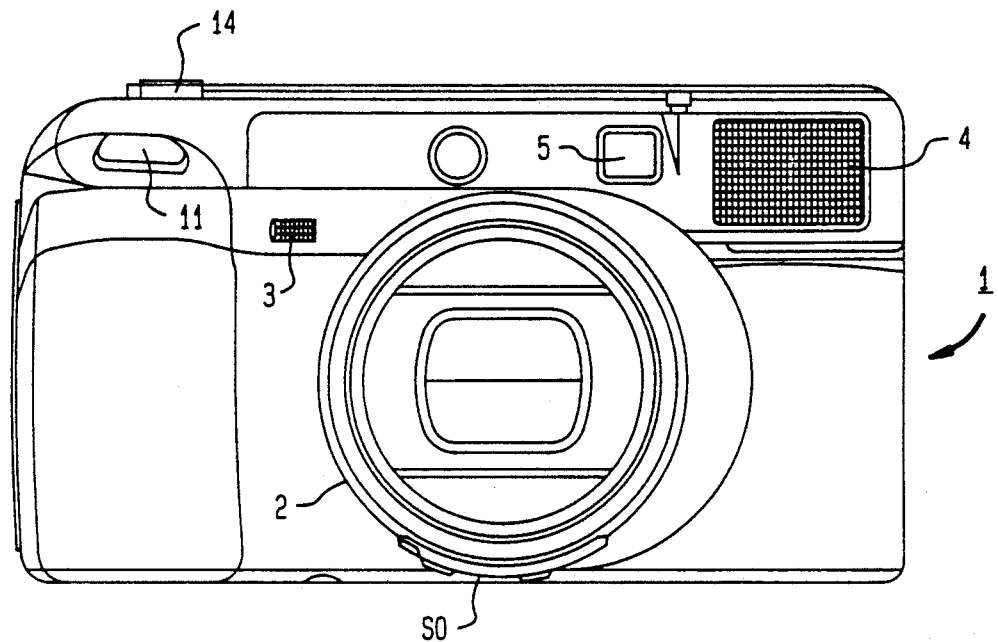
FIG. 1 is a front view of an embodiment of a camera according to the present invention.

An embodiment of the present invention will be now described in the following with reference to the appended drawings.

Firstly, an outer configuration of a camera of an embodiment of the present invention will be described with reference to FIGS. 1 to 3. Numeral 1 indicates a camera body. In front of the camera body 1, there are provided a photographing lens 2, a sound inputting microphone 3, a flashlight 4 and a finder 5. On the back surface of the camera body 1, a sound playback speaker 6 and a recording/playback mode changeover switch 7 are provided. On the side surface of the camera body 1, there are provided a card holder 9 which can be opened and closed and into which a sound card 8 (a first memory means) is inserted and a ejecting lever 10 for opening the card holder 9. And on the upper surface of the camera body 1, there are provided a shutter release button 11, a recording timing setting button 12, a recording time setting button 13, a sound release button 14, a LCD 15 for displaying various kinds of data and the like.

Every time the recording timing setting button 12 is pushed, a manual recording mode, a pre-release recording mode (it is regarded as the recording timing 1) in which sounds are automatically recorded for a predetermined time immediately before a shutter release operation (photographing), a pre-and-post-release recording mode (it is regarded as the recording timing 2) in which sounds are automatically recorded for a predetermined time before and after a shutter release operation, and a post-release recording mode (it is regarded as the recording timing 3) in which sounds are automatically recorded for a predetermined time immediately after the shutter release operation, are changed over successively in this order. The above-mentioned manual recording mode is a mode in which sounds are recorded from the time when the sound release button 14 is pushed till a predetermined time passes or till the sound release button 14 is pushed again.

Every time the recording time setting button 13 is pushed, the recording period is changed over to 0 sec. (no recording), 10 sec., 20 sec. and 40 sec. (period for one frame photographing) successively in this order).

Now, the relation of the memory capacity of the sound card 8, the recording time and the tone quality will be described. Recording is executed through sampling. Generally, in order to play back sounds of musical instruments or the like equally to the original sounds, if using a sampling frequency of 16 KHz in ADPCM (Adaptive Differential Pulse Code Modulation) system, it is necessary to encode with about 4 bits. In this case, a memory capacity of 80K bytes is needed for 10 seconds according to the formula 16 KHz×4×10 sec=640K bits=80K bytes. At this time, by changing the sampling frequency to 8 KHz, 20 seconds of recording time can be obtained with the same memory capacity, and further, by changing the frequency to 4 KHz, 40 seconds of recording time can be obtained. When sampling frequency is 8 KHz, high tone is hard to play back. If tone quality is not regarded, e.g. for quiet speaking as in conference, 4 KHz is convenient as sampling frequency.

The sound release button 14 is a button for starting to record. In the manual recording mode, by pushing the button 14 again, recording is stopped. In the playback mode, by pushing the button 14, sound playback is started.

Figure 2:
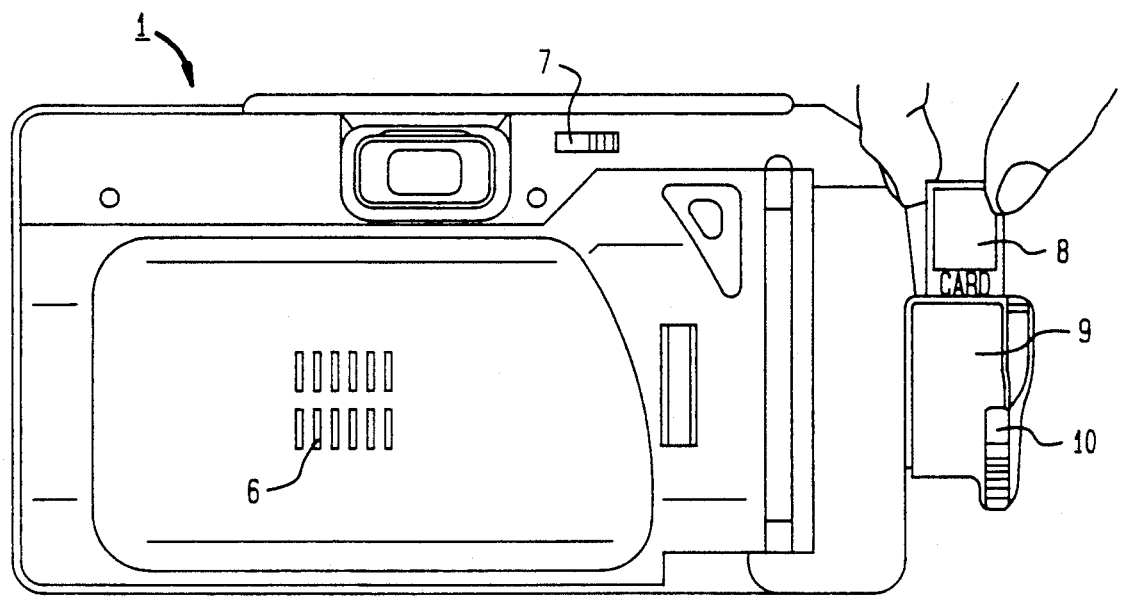
FIG. 2 is a rear view of the camera.
Figure 3:
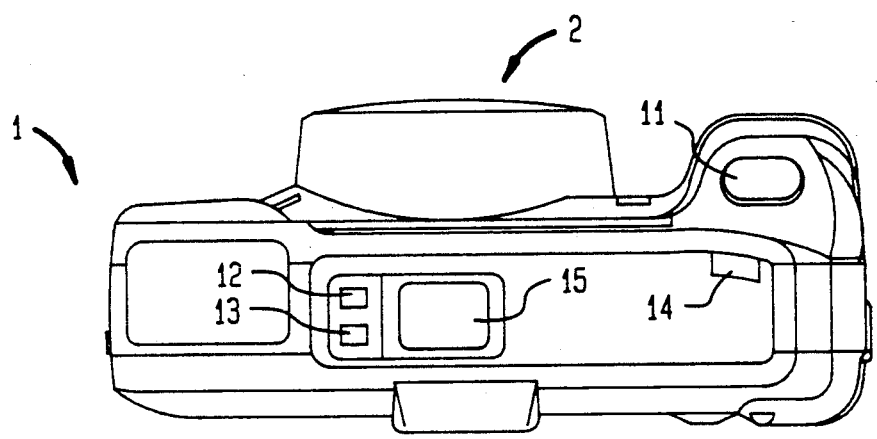
FIG. 3 is a top view of the camera.

Though not shown in FIGS. 1 to 3, a silver halide film is loaded in the camera body 1. On the film, an optical image of an object incident through the photographing lens 2 is photographed. In the camera body 1, there is a button for selecting or setting a frame at the time of playback sounds which have been recorded by camera function.

Now, displaying of the LCD 15 will be described in the following with reference to FIG. 4.

Figure 4A:
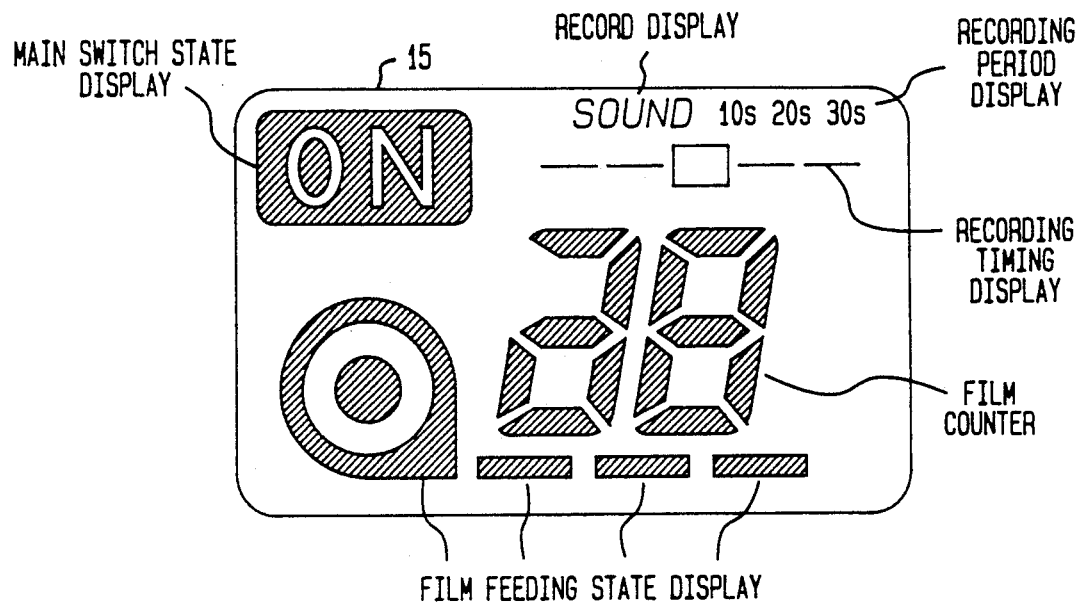
FIGS. 4(a) to 4(e) are structural views of a display section of the camera.

In FIG. 4(a), the display "ON" on the LCD 15 indicates ON state of a below-mentioned main switch, and the display "sound" indicates that a mode in which sound recording is carried out is set. When the display "sound" is not disappear, it means that a mode in which no sound recording is carried out is set. The display "10S 20S 40S" indicates the sound recording period, "—" indicating the sound recording timing to the photographing timing indicated as "☐". Numerals and patterns indicate the film counter number and the film feeding state respectively. The display "10S 20S 40S" is adapted to come on and off during sound recording and playback.

Figure 4B:
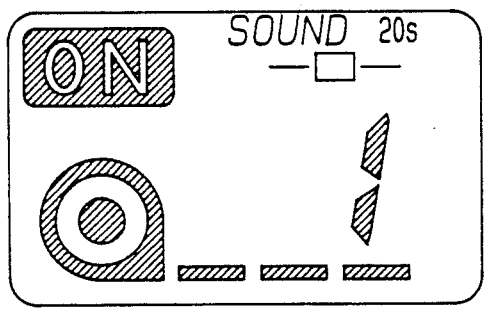
Figure 4C:
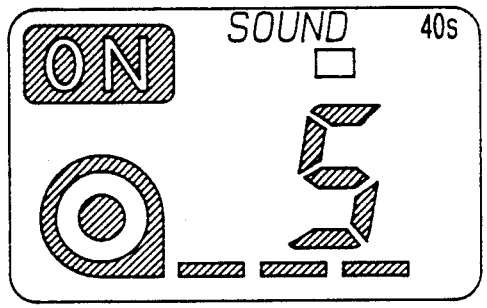
Figure 4D:
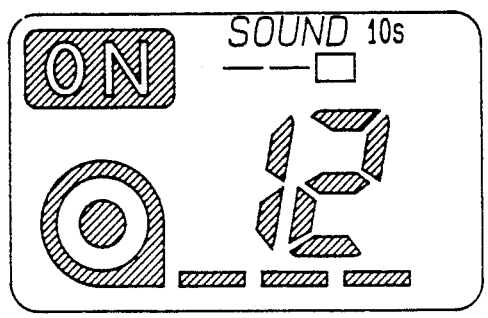
Figure 4E:
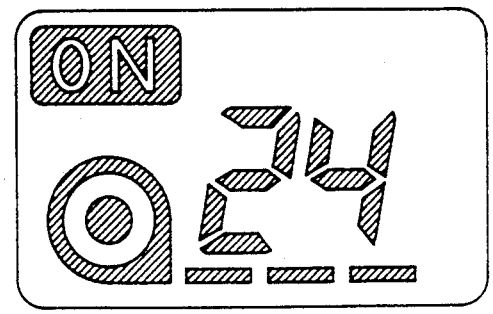

FIG. 4(b) shows that total 20 second sound recording in pre-and-post-release recording mode is possible is set. FIG. 4(c) shows that 40 second sound recording is possible in manual recording is set. FIG. 4(d) shows 10 second sound recording in pre-release recording mode is set. And FIG. 4(e) shows that a mode in which sound recording is impossible is set.

Figure 5:
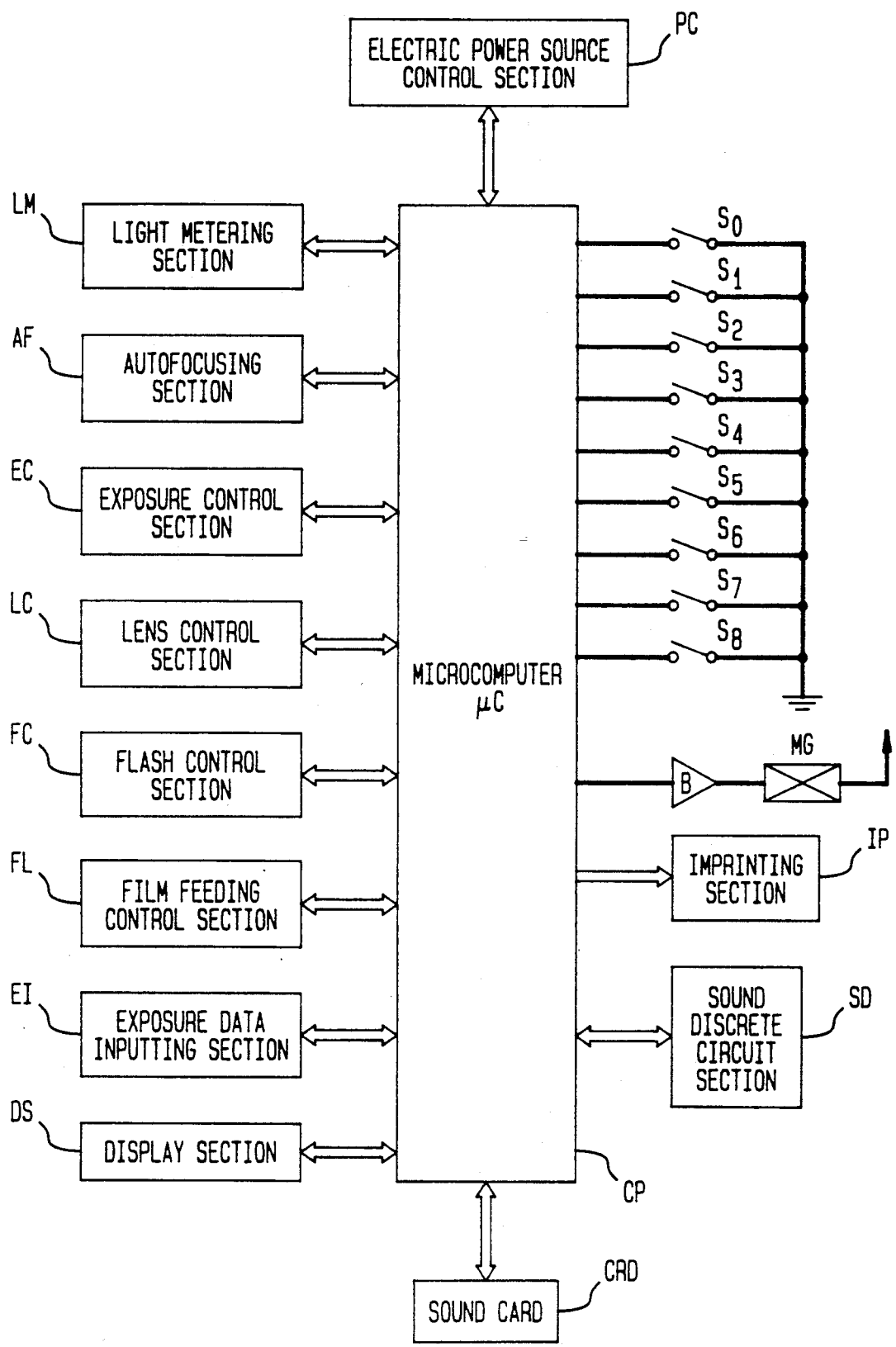
FIG. 5 is a circuit block diagram of the camera.

Now, a circuit block diagram of the camera will be described with reference to FIG. 5.

A microcomputer μC controls the whole of the camera in the operating steps shown in the below-mentioned flow charts. A light metering section LM measures brightness of an object. An autofocusing section AF measures object distance. An exposure control section EC controls aperture and shutter based on Tv value and Av value calculated by the microcomputer μC. A lens control section LC drives the lens based on the measured distance data. A flashlight control section FC controls light emission of a flashlight based on the measured brightness data. A film loading control section FL controls film winding. Each of these sections executes data communication with the microcomputer μC. An exposure data input section EI inputs data shown by the DX codes and the like of the film (e.g. film sensitivity data) into the microcomputer μC.

A display section DS is driven by an output from the microcomputer μC and displays various data on the above-mentioned LCD 15 and the like. An electric power source control section PC receives outputs from the microcomputer μC and controls an electric power source of each section. An imprinting section IP receives an output from the microcomputer μC and imprints data on a film corresponding to sound data as described below. A plunger MG drives the light shielding plate inserted in front of the above-mentioned data imprinting part of a film at the time of photographing so as to shield the light passing through the photographing lens system, and an output from the microcomputer μC is fed through a buffer B to the plunger MG. A sound discrete circuit SD is controlled by the microcomputer μC and converts inputted sounds into electric signals temporarily stores sound data, and plays back the sounds. A sound card CRD is used for storing (recording) sound data through the data communication with the microcomputer μC.

As switches for inputting signals into the microcomputer μC, there are provided a main switch S0, a light metering starting switch S1, a release switch S2 for executing photographing, a sound recording/playback changeover switch S3 (the switch 7 in FIG. 2), a sound recording timing changeover switch S4 (the button 12 in FIG. 3), a sound recording period changeover switch S5 (the button 13 in FIG. 3), a sound release switch S6 (the button 14 in FIG. 3), a sound card attaching switch S7, a sound playback frame selecting switch S8 and the like.

Now, operation of the microcomputer μC will be described with reference to FIGS. 6(a) and 6(b). When the microcomputer μC is on standby (step #1), the main switch S0 is turned ON (step #2). Then, the state of the light metering starting switch S1 is detected (step #3). When the switch S1 is OFF, the state of the sound card attaching switch S7 is detected (step #4). When a sound card 8 has been attached, the switch S7 is turned OFF and data in the sound card, for example, address of empty area are read (step #5). Then, the state of the sound recording/playback changeover switch S3 is detected and it is judged what mode has been set (step #6). When the switch S3 is OFF, the program advances to the sound recording mode at step #7 and the following steps. When the switch S3 is ON, the program advances to the sound playback mode at step #24 and the following steps.

In the sound recording mode, when the sound is being played back, the sound playback operation is stopped (step #7), and it is judged whether the sound recording timing changeover switch S4 has been changed over or not (step #8). When the answer is YES, the sound recording timing is changed in the above-mentioned order (step #9). And when the answer is NO, the sound recording timing is not changed. Then, it is judged whether the sound recording period changeover circuit S5 has been changed over or not (step #10). When the answer is YES, the sound recording time is changed in the above-mentioned order (step #11). And when the answer is NO, the sound recording time is not changed. Then it is judged whether the sound recording timing mode is the automatic sound recording mode or not (step #12).

When the automatic sound recording mode has been set, the microcomputer μC judges whether a sound recording starting signal is outputted from the sound circuit SD or not (step #13). When the answer is YES, the program advances to step #17, and it is judged whether there are some areas for storing data or not, that is, whether there are some empty areas in the memory of the card or not based on the read out card data. When there are empty areas, sound recording operation is started (step #18) and at the same time this is displayed on the display section DS (step #19). When there are no empty areas, this is displayed on the display section DS (step #19). At step #18 and the following steps, the sound recording is executed by storing sounds in a semiconductor memory (mentioned later) of the sound discrete circuit section SD. Simultaneously with the starting of the sound recording, the microcomputer μC starts outputting signals such as clock signals to the sound discrete circuit section SD, and starts operation of a timer for determining the sound recording time provided in the microcomputer μC. After step #19, it is judged whether the timer for determining the sound recording/playback time is overflowed or not (step #20). When it is not overflowed, the program returns to step #2. When it is overflowed, the sound recording and playback is ended and the sound recording/playback operation is stopped, and the sounds are recorded in the sound card (step #21). Then the program returns to the above-mentioned step #2, and the same operations are repeated.

When it is judged at step #12 that the automatic sound recording mode has not been set, or when the automatic sound recording mode has been set at step #12 but no sound recording starting signal is inputted at step #13, the program advances to step #14, and the sate of the sound release switch S6 is detected (step #14). When the sound release button 14 is pushed and the sound release switch 6 is closed, it is judged whether it is the manual sound recording mode or not (step #15).

When it is not the manual sound recording mode, that is, it is the automatic sound recording mode, the program advances to the above-mentioned step #17. When it is the manual sound recording mode, it is judged whether sound recording is now going on or not (step #16). When sound recording is not going on, the program advances to step #17, and when it is going on, the sound recording operation is stopped (step #22). Therefore, when the sound release button 14 is once pushed in the manual sound recording mode, sound recording is started, and when the sound release button 14 is pushed again, the sound recording operation is stopped. After the sound recording operation is stopped at step #22, the sounds are recorded in the sound card (step #23), and then the program goes to step #19.

When the sound recording/playback changeover switch S3 is ON at the above-mentioned step #6 and the sound playback mode is executed, if sound recording is going on, the sound recording operation is stopped (step #24), and the state of the sound release switch S6 is detected (step #25). The sound release switch S6 is ON, it is judged whether sound playback is going on or not (step #26), and when sound playback is not going on, sound playback operation is started (step #27), and the program goes to step #19. At the time of starting the sound playback operation, operation of the sound playback timer is started by outputting a signal to the sound discrete circuit section SD. On the other hand, when sound playback is going on, it means that the sound release switch S6 has been turned ON for the second time. Therefore, the sound recording operation is stopped (step #28), and the program goes to step #19.

When the state of the card attaching switch S7 indicates that the card is not attached (the switch S7 is ON), sound recording/playback operation is stopped, and the program goes to step #19. Further, at step #14 or #25, the sound release switch S6 is not turned ON (that is, the switch S6 is being kept in OFF or ON state), the program goes directly to step #19.

When the light metering switch S1 is turned ON at the above-mentioned step #3, the light metering step (step #30), the distance measuring step (step #31), the step of inputting photographing data such as DX code and the like of the film (step #32), the exposure calculation step (step #33), the flash charge step (step #34), and the display step (step #35) are executed, and the program returns to step #2 and repeats the same steps till the release switch S2 is turned ON.

Figure 6B:
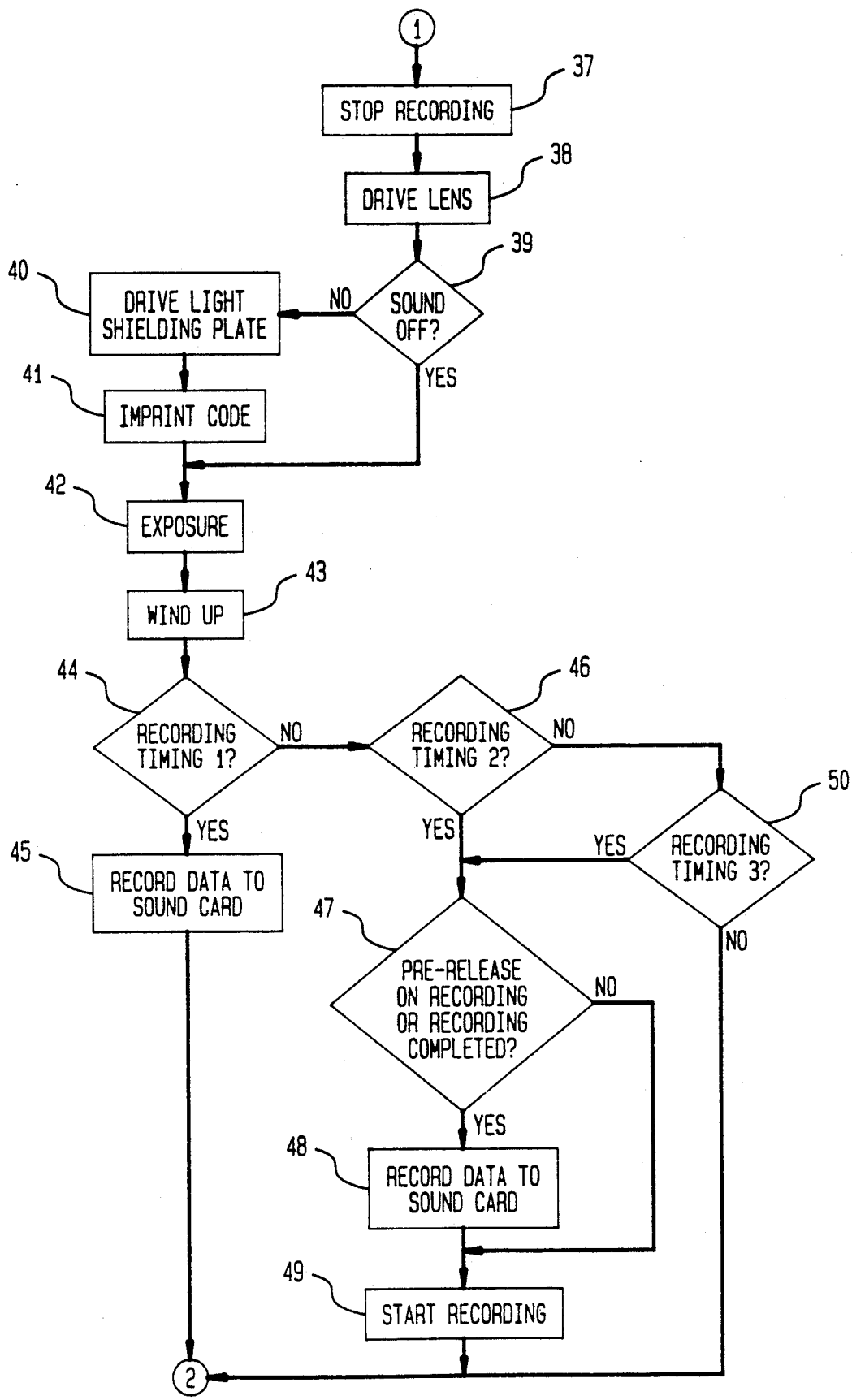

When the release switch S2 is turned ON, and if sound recording is going on, the sound recording operation is stopped (step #37 in FIG. 6(b)). Then the lens is driven to in-focus condition based on the data obtained by the above-mentioned light metering and distance measuring steps and the like (step #38). Then, it is judged whether it is a mode in which sound recording, whether the sound card has not been attached, or whether there is no empty area in the sound card (step #39). When sound recording mode can not be allowed, a magnet MG is turned ON for driving the before-mentioned light shielding plate (step #40) prior to imprinting data (codes and the like) on the film corresponding to storing areas of the sound data. Then, the corresponding data are imprinted (step #41). Thereafter exposure is executed at an adequate aperture value and shutter speed (step #42), and the film is wound up (step #43). On the other hand, when sound recording mode is OFF state, the program advances to step #43 without executing the above-mentioned steps #41 and #42.

Then, it is judged whether it is the sound recording timing 1 as the pre-release recording or not (step #44). When the answer is YES, the data stored in the semiconductor memory as above-mentioned are recorded in the sound card 8 (step #45), and the program returns to step #2. On the other hand, when it is not the recording timing 1 at step #44, it is judged whether it is the sound recording timing 2 as the pre-and-post-release recording or not (step #46). When the answer is YES, it is judged whether sound recording of the pre-release is going on or has been completed (step #47). When sound recording of the pre-release is going on, it means that the release switch S2 is turned on during the sound recording of the pre-release. Therefore, in this case, the sound recording of the pre-release is stopped and the sound data stored in the semiconductor memory are recorded in the sound card (step #48). When it is judged that the sound recording of the pre-release has been completed at step #47, it means that the pre-release recording is completed and therefore the operation of step #48 is also executed. Then, post-release recording is started (step #49). Further, when sound recording of the pre-release is neither going on nor has been completed, the post-release recording is started (step #49).

When it is not the sound recording timing 2 at step #46, it is judged whether it is the sound recording timing 3 as the post-release recording or not (step #50). When the answer is YES, the above-mentioned step #47 and the following steps are executed. After step #49 and when it is not the sound recording timing 3 at step #50, the program returns to step #2 and the same operations are repeated.

Figure 7:
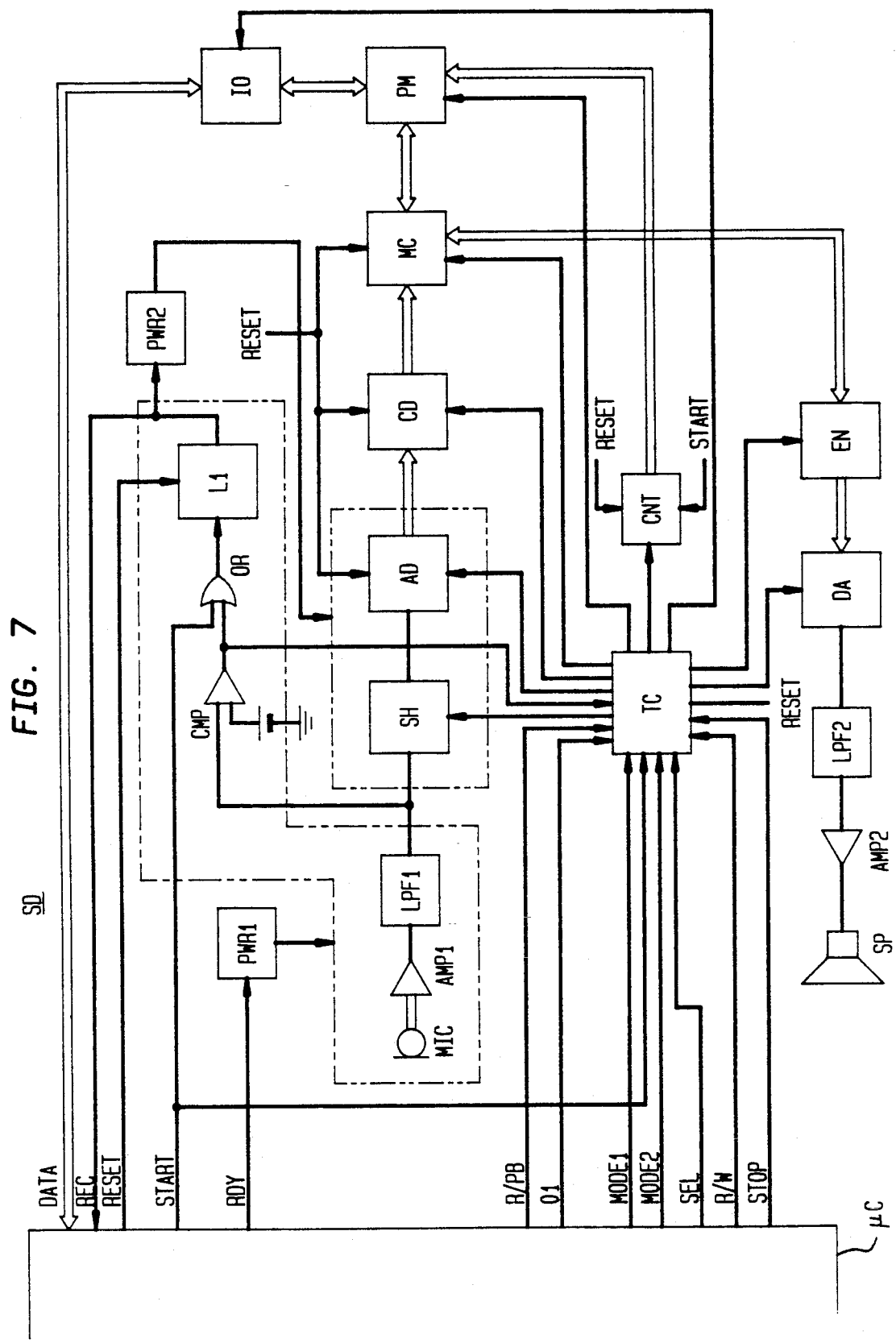
FIG. 7 is a block diagram of a sound circuit section of the camera.

Now, the structure of the sound discrete section SD will be described in the following with reference to FIG. 7.

In each circuit block of the section, reference mark PWR1 indicates an electric power supply circuit for supplying electric power to a sound input circuit of analogue, and the electric power supply circuit PWR1 is turned ON/OFF by a sound recording ready signal RDY outputted from the microcomputer μC. PWR2 indicates an electric power supply circuit for supplying electric power to a sample hold circuit SH, an analogue-to-digital converting circuit AD and other digital circuits.

MIC indicates a microphone. AMP1 and AMP2 indicate amplifying circuits. LPF1 and LPF2 indicate filter circuits. SH indicates a sample hold circuit. AD indicates an AD converting circuit. CD indicates a circuit for compressingly encoding AD converted sound signals for storage. MC indicates a control circuit for storing the encoded signals in a memory. PM indicates a semiconductor memory for storing the sound codes. IO indicates an interface for communicating data between the memory PM and the microcomputer μC. CNT indicates an address counter for the memory PM. EN indicates an expanding circuit for expanding the coded signals. DA indicates a digital-to-analogue converting circuit. SP indicates a speaker. TC indicates a control circuit for a clock and timing. CMP indicates a comparator. When the sound input level becomes higher than a reference level in the automatic sound recording mode, the comparator CMP outputs a signal to change to the automatic sound recording. L1 indicates a latch circuit.

DATA indicates a bus line (referred to as DATA bus) for communicating data between the microcomputer μC and the memory. REC indicates a sound recording starting signal for starting automatic sound recording, RESET indicates a signal for resetting each circuit. START indicates a manual starting signal for sound recording or playback. RDY indicates a sound recording ready signal. R/PB indicates a sound recording/playback mode changeover signal. $\phi 1$ indicates a clock. MODE 1 and MODE 2 indicate sound recording time mode selecting signals (10 sec./frame, 20 sec./frame or 40 sec./frame is selected). R/W indicates a signal for changing over the data communicating direction between the memory PM and the microcomputer $\mu$C. STOP indicates a signal for temporarily stopping the sound recording operation. SEL indicates a selecting signal for designating the memory PM as the other part of the data communication of the microcomputer $\mu$C.

Now, the sound recording operation of the above-mentioned sound discrete section SD will be described in the following.

(1) The electric power supply circuit PWR1 is turned ON by a RDY signal, and the sound input circuit section starts to operate.

(2) During the automatic sound recording, when the sound level (an output of the filter circuit LPF1) becomes higher than a predetermined level, the comparator CMP outputs a signal. This signal is transmitted through an OR gate to the signal latch circuit L1 and is latched there.

(3) An output of the signal latch circuit L1 is transmitted as a REC signal to the microcomputer $\mu$C and gives the microcomputer $\mu$C an information that the sound recording is started. And at the same time, it operates the electric power supply circuit PWR2 to supply electric power to the remaining part of the sound discrete section.

(4) During the manual sound recording time, the latch circuit L1 is reset by a RESET signal, and therefore sound recording does not start if a signal is outputted from the comparator CMP. When the sound release switch of the camera is turned ON, a START signal is outputted from the microcomputer $\mu$C and at the same time the RESET signal is stopped, whereby sound recording is started.

(5) When the microcomputer $\mu$C detects that sound recording is started, it outputs a clock $\phi 1$.

(6) Sample hold time changes with the combination of the signals of MODE 1 and MODE 2. Therefore, by changing the sample hold time to 16 KHz, 8 KHz or 4 KHz according to the signals of MODE 1 and MODE 2, the tone quality and the sound recording time can be changed.

(7) The sample hold signal is converted to a 8 bit digital signal in response to a signal outputted from the control circuit TC.

(8) Further, the 8 bit signal is compressed in the compressing circuit CD in response to a timing signal outputted from the control circuit TC. Generally, it is compressed to about 4 bit digital signal in the ADPCM system.

(9) The compressed signal is stored in the memory PM under a timing control of the control circuit TC. The address of the signal to be stored is designated by the address counter CNT.

(10) The address counter CNT counts up according to a signal from the control circuit TC. When it overflows, it returns to the initial value and then counts up. Therefore, when the memory PM overflows, stored data are renewed successively in such a manner that the oldest one is firstly renewed.

(11) When there is a shutter release operation or the like, a STOP signal is transmitted to the control circuit TC. Thereby, transmission of a timing signal or a clock to each section is stopped, and the sound recording operation is stopped. By stopping the output of the STOP signal, the sound recording operation is started again from the state immediately before it was stopped.

(12) When sound recording relating to a certain frame of the film is completed, data in the memory PM are stored through the interface 10 and the microcomputer $\mu$C in the sound card.

(13) Data transmission from the memory PM to the microcomputer $\mu$C is executed by firstly outputting a SEL signal from the microcomputer $\mu$C and then instructing, through a R/W signal, the memory PM to transmit data to the microcomputer $\mu$C.

(14) By transmitting a clock $\phi 1$ from the microcomputer $\mu$C, address data corresponding to the content of the address counter CNT are transmitted to the DATA bus. Since the address counter CNT stops at the time of stopping sound recording operation, data can be successively transmitted in such a manner that the oldest one is firstly transmitted as the address counter CNT continuously counts up.

(15) When a predetermined amount of data are transmitted, the microcomputer $\mu$C stops outputting a clock and the like and outputs a RESET signal, thereby resetting the whole of the sound circuit.

Now, sound playback operation will be described in the following.

(1) By outputting a SEL signal and R/W signal from the microcomputer $\mu$C, an instruction to receive data from the microcomputer $\mu$C is given to the memory PM.

(2) The microcomputer $\mu$C outputs data received from the sound card or the like to the DATA bus and at the same time outputs a clock $\phi 1$, so that the data are recorded in the memory PM.

(3) The sound data are inputted in the memory PM successively from the predetermined address as the address counter CNT is previously reset.

(4) When the data transmission is completed, the MODE 1 or 2 signal and the R/PB signal corresponding to the data transmitted from the microcomputer $\mu$C are changed over to the sound playback side. The SEL signal and the R/W signal are reset.

(5) When a clock $\phi$ is outputted from the microcomputer $\mu$C, the data are successively transmitted from the memory PM through the control circuit MC to the expanding circuit EN.

(6) The compressed data is expanded to the original state in the expanding circuit EN and then the data are converted to analogue data in the DA circuit. The analogue converting timing is determined by the MODE 1 and MODE 2.

(7) The data are transmitted through the filter LPF2 and the amplifying circuit AMP2 and outputted as sounds from the speaker SP.

Now, a device 20 of the imprinting section IP for executing the above-mentioned step #41 (FIG. 6(b)) will be described in the following with reference to FIGS. 8 and 9.

In the sound recording mode when the release button 11 is pushed (when the release switch S2 is turned ON), photographing is executed and at the same time this imprinting device 20 imprints data corresponding to the sound data (memory address of the sound data in the sound card and the like) as a bar code on the film from the back thereof. The imprinting device 20 comprises a light source 23d and a light defusing plate 23b provided on a base plate 22 disposed behind a film 21 (a second memory means) loaded in the back lid 1' of the camera body, an imprint display section 24 using liquid crystal or the like provided in a imprinting light path P, a lens 25, a reflecting mirror 26 and a movable light shielding plate 27 provided in front of the film 21.

The movable light shielding plate 27 can be projected and retracted with respect to a picture frame 28 by means of a guide 29. And at the same time, the movable light shielding plate 27 is engaged with an end portion of an operative lever 30 urged by a spring 31, so that at usual time the movable light shielding plate 27 is out of the picture frame 27 as shown in a dot-and-bar line. A plunger shaft 33 of a plunger 32 is engaged with the other end portion of the operative lever 30. When the plunger 32 is driven, the plunger shaft 33 moves leftward in the figure against the urging force of the spring 31 and the operative lever 30 rotating counterclockwise, so that the light shielding plate 27 is projected in the picture frame 28.

The imprinting device 20 is operated as follows. When the release button 11 is pushed, the light source 23a is lit. By this light of the light source 23a, a bar code displayed by a liquid crystal display of the imprinting display section 24 (later described with reference to FIGS. 10 and 11) is imprinted through the lens 25 and the reflecting mirror 26 onto the film 27 from behind thereof. This bar code is to be imprinted clearly enough to read later. Therefore, the movable light shielding plate 27 is inserted in front of the imprinting portion of the film 21 prior to starting the opening operation of the shutter for photographing, so that the light passing through the photographing system is shielded. At the same time with the completion of the photographing, the movable light shielding plate 27 is retracted to the predetermined position. The imprinting display section 24, the light source 23a and the like are controlled by the circuit of the imprinting section IP shown in FIG. 5. Further, for the imprinting display section 24, a device such as LED may be used instead of a LCD.

Figure 10A:
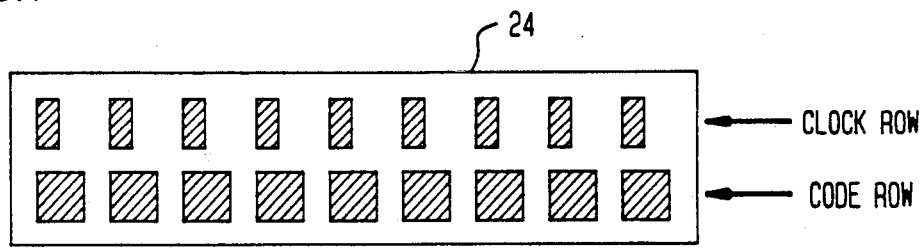
FIG. 10A and 10B is a pattern view of an imprinting display section of the imprinting device.
Figure 10B:
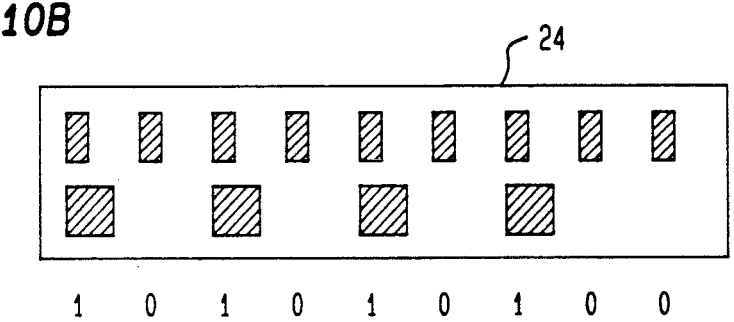
Figure 11:
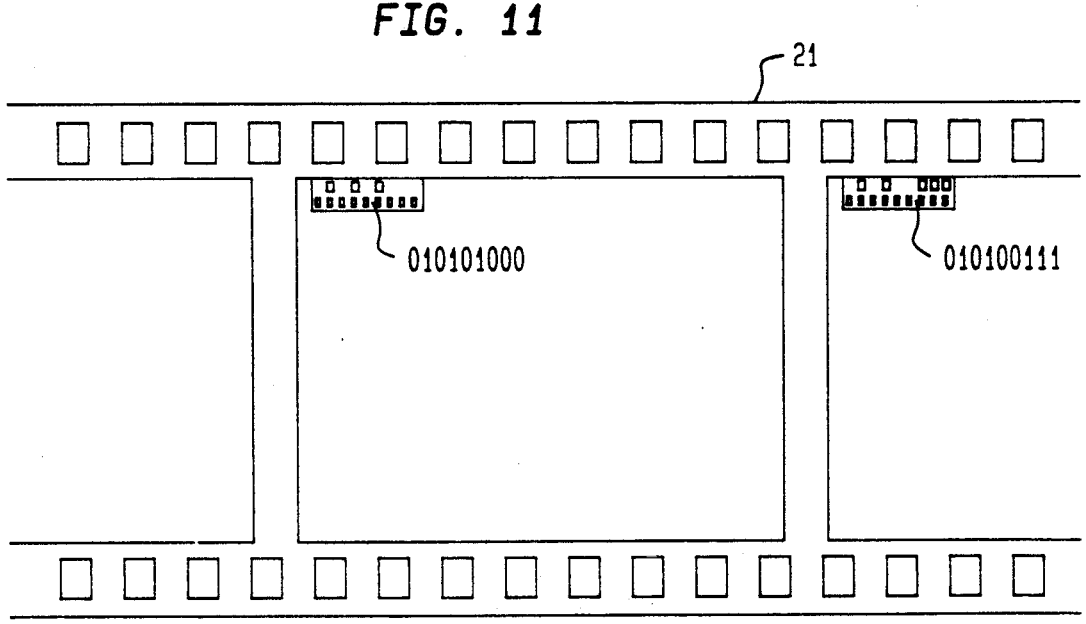
FIG. 11 is a view showing a film on which a code is imprinted.

Now, an imprinting segment pattern of the imprinting display section 24 will be described with reference to FIGS. 10(a) and 10(b), and a film on which a code has been imprinted will be described with reference to FIG. 11.

The imprinting display section 24 comprising a LCD will be now described. When no electric signal is given, the LCD does not pass any light (negative type), and when an electric signal is given, the oblique line parts shown in FIGS. 10(a) and 10(b) become transparent and pass the light. This example of a segment pattern comprises a clock row and a code row. Each segment of the code is longer in the direction of the row than that of the clock row. In the display example shown in FIG. 10(b), the code row is "101010100", in which the leading two bits indicate the card number of the sound card, the next two bits indicating the number of cleared times in the sound card, and the remaining five bits indicate the address of the sound data recorded in the sound card. In this example of the segment pattern, the bits are uniformly arranged. However, a starting bit and a final bit may be provided so as to decrease errors in reading the segment pattern. As shown in FIG. 11, the code is imprinted in one corner of a photographing frame of the film. The codes imprinted on the film shown in FIG. 11 are "010101000" and "010100111".

Now, the sound card 8 and the sound card attaching part will be described with reference to FIGS. 12, 13, 14(a) and 14(b).

Figure 12:
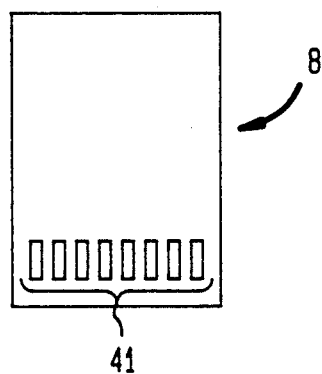
FIG. 12 is a front view of a sound card.
Figure 13:
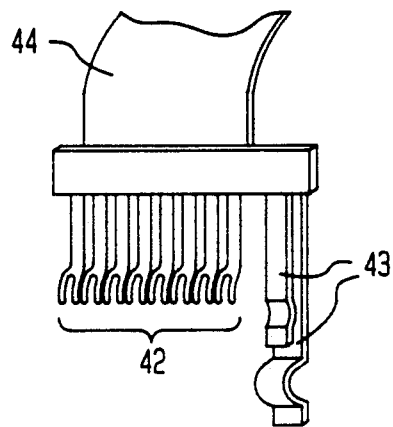
FIG. 13 is a perspective view of contact points on the camera side to which the sound card is attached.
Figure 14A:
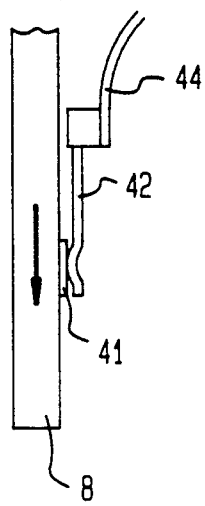
FIGS. 14(a) and 14(b) are explanatory views of the contact point section.
Figure 14B:
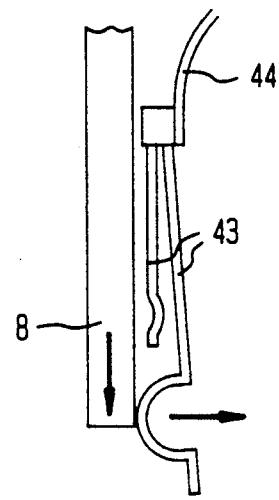

As shown in FIG. 12, eight terminals 41 are provided on the surface of the sound card 8. As shown in FIG. 13, the card attaching part comprises eight flexible contact points 42 positioned in correspondence to the terminals 41, a card attaching switch 43 and a flexible base plate 44 on which the contact points 42 and the card attaching switch are provided. When the sound card 8 is attached to the camera, the card terminals 41 become conductive with the contact points 42 as shown in FIG. 14(a), and at the same time, one edge of the sound card 8 pushes the card attaching switch 43 which has been in ON state to turn OFF the same. Thereby, a signal indicating that the sound card 8 has been attached is inputted to the camera side.

Figure 15:
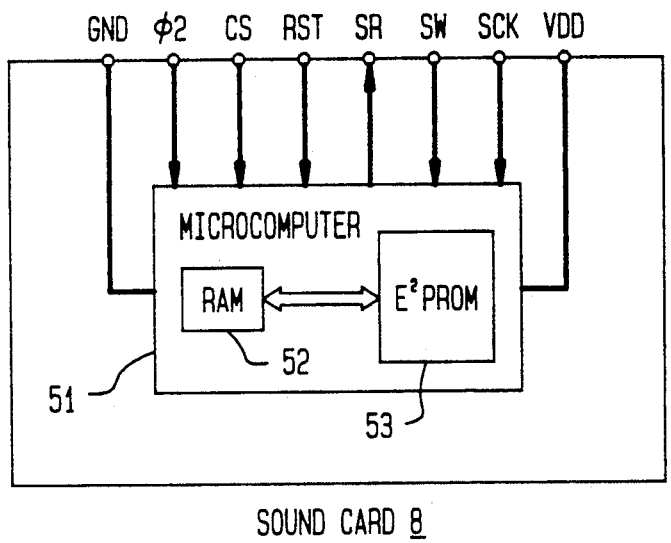
FIG. 15 is a view showing electrical structure of the sound card.

Now, electrical structure of the sound card 8 will be described in the following with reference to FIG. 15.

The sound card 8 has a microcomputer 51 therein-side, and the microcomputer 51 has a RAM 52 for temporarily storing data and an E$^2$PROM 53 thereinside. The RAM 52 temporarily stores data corresponding to one photographed frame, and the data stored in the RAM 52 are stored as a whole in the E$^2$PROM 53. Reference mark $V_{DD}$ and GND indicate electric power source terminals of the sound card 8. SCK indicates a serial clock terminal. SW indicates a serial data input terminal. SR indicates a serial data output terminal, RST indicates a terminal for inputting a reset signal to the microcomputer 51. CS indicates a terminal for selecting an input signal to effect serial communication of the sound card. $\phi 2$ indicates a clock terminal.

Figure 16:
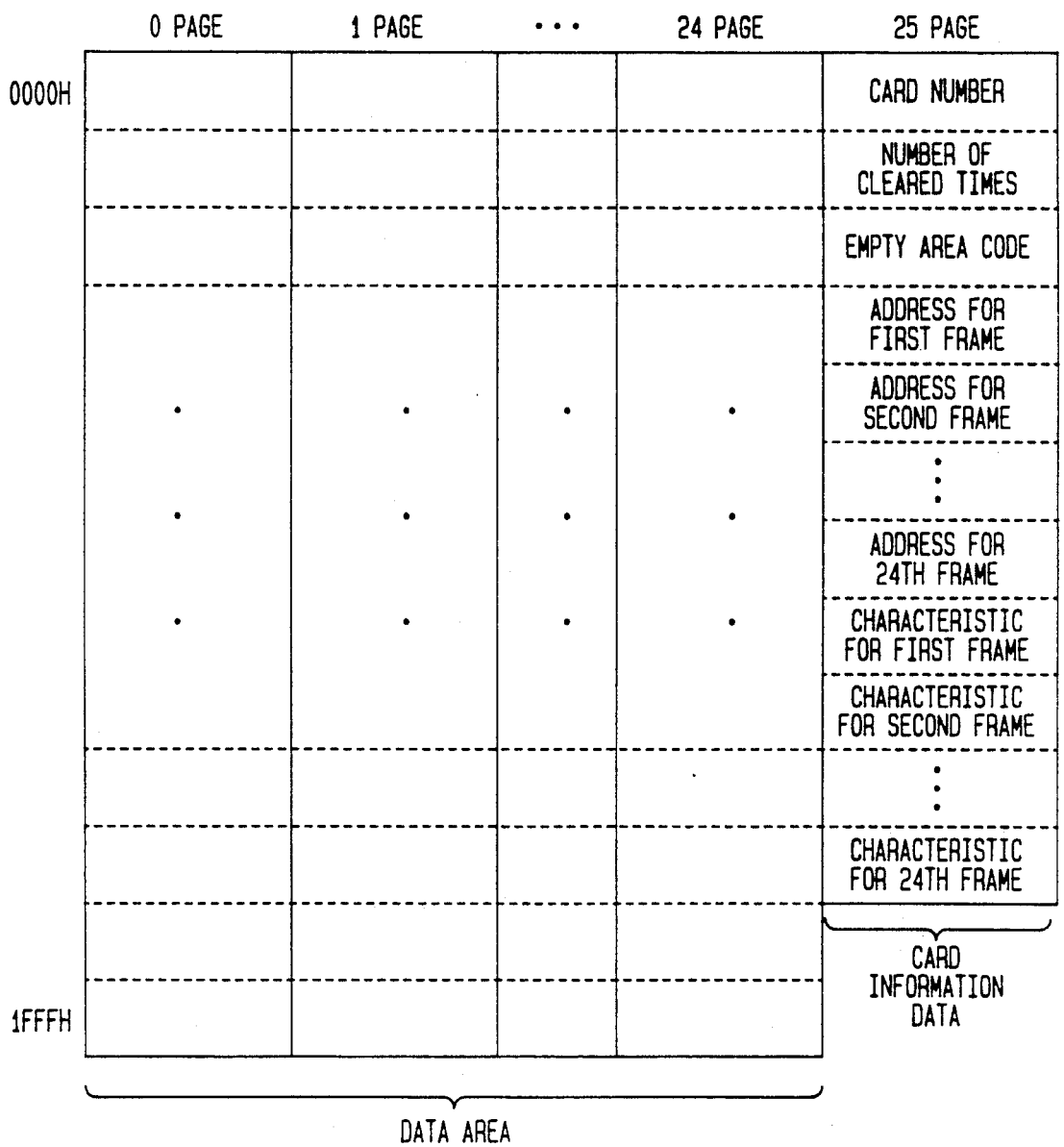
FIG. 16 is a structural view of a memory of the sound card.

A memory map of the sound card memory (E$^2$PROM) is shown in FIG. 16. The sound card memory has a data area and a card information data area. In the card data area, the card number, the number of cleared times, empty area codes, addresses of respective frames and characteristics data of respective frames are stored. The characteristic data are data necessary for playback the recorded data, for example, a recording sample frequency and the like. The bar code data (designated signals) comprise the card number, the number of cleared times and the address as shown in FIG. 10, and are recorded on a print (picture). When the address of the sound data recorded in the sound card correctly corresponds to the printed code, the sounds can be played back without fail by reading out the printed code. However, since the capacity of the sound card is limited, generally, data relating only one film can be recorded in the sound card. This is because the following reason.

Using sampling of 16 KHz, ADPCM system, coding of 4 bits, and recording time of 10 seconds, the number of bits of the sound data per one frame is 640K bits according to the following formula.

$$16K \times 4 \times 10 \times = 640K \text{ bits}$$

Therefore, for 24 frames, 15M bits are necessary according to the formula $640K \times 24 \approx 15M$ bits. A sound card capable of recording therein sound data relating to a number of films becomes expensive and impractical. Further, it is very troublesome for a user to prepare a number of cards. Therefore, a sound card is adapted to be repeatedly used many times.

From this fact, if the card number and the number of cleared times are not stored in the sound card, prints of respective films have the same bar code thereon, thereby causing confusion. further, as below-mentioned, when data of a plurality of sound cards are wholly stored in a memory such as a magnetic disk, sometimes sounds of the same code of another film may be erroneously played back or sounds stored in another sound card may be played back. Accordingly, as above-mentioned, the card number which changes with each card and the number of cleared times which is renewed every time one film is photographed are recorded, imprinted in each film and given to each print.

Figure 17B:
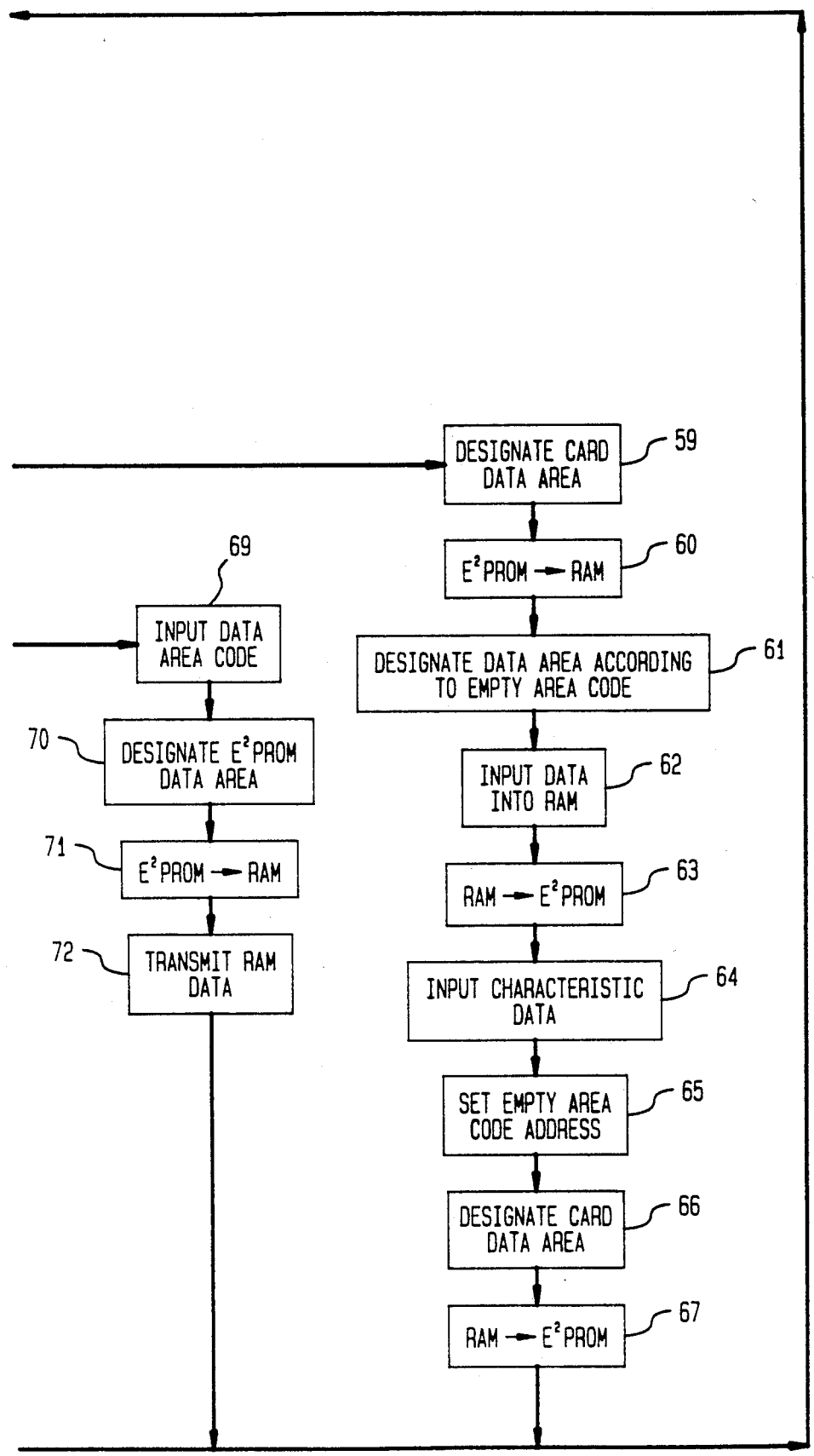

Now, operation of the microcomputer 51 provided in the sound card will be described in the following with reference to a flow chart of FIG. 17.

When the microcomputer 51 is on standby (step #51), a selecting signal CS from the microcomputer μC on the camera side is inputted in the microcomputer 51 (YES at step #52). Thereby, the microcomputer 51 is out of the standby state, and firstly command data for designating a function of the sound card are transmitted through a serial communication to the microcomputer 51 (step #53). This command is one of a card data reading, data recording, data reading and data clearing commands. Then, command data are successively judged (steps #54, #58, #68 and #73). When the command is a card data reading command (YES at step #54), the area in which the card data are stored in the memory $E^2$PROM 53 provided in the sound card is designated (step #55). The data are transmitted from $E^2$PROM 53 to the temporarily storing memory RAM 52 (step #56), and the data in the RAM 52 are transmitted through a serial communication to the microcomputer μC. Then the program returns to the standby state.

When the command is a data recording command (YES at #58), the area in which the card data are stored in the memory $E^2$PROM 53 is designated (step #59). The data are transmitted from $E^2$PROM 53 to the RAM 52 (step #62). Then, empty areas of the sound data are detected according to empty data codes, and an area for recording data therein is designated (step #61). Then, the data are outputted through a serial communication from the microcomputer μC into the RAM 52 (step #62), and the same data in the RAM 52 are recorded in the E PROM 53 (step #63). Further, data characteristics are inputted from the microcomputer μC into the RAM 52 and store there (step #64). Nextly, addresses corresponding to the addresses of the empty area code are stored in RAM 52 as a new empty area code (step #65). Further, a card data area is designated, and the above-mentioned data in the RAM 52 are stored in the card data area of the $E^2$PROM 53 (step #67). Then the program returns to the standby state.

When the command is a reading command (YES at step #68), a data area code is inputted from the microcomputer μC through a serial communication into the microcomputer 51 (step #69). A data area of the $E^2$PROM 53 is designated according to the above-mentioned data area code (step #70). Then the data in the $E^2$PROM 53 are transmitted to the RAM 52 (step #71), and the data in the RAM are transmitted through a serial communication to the microcomputer μC (step #72). The program returns to the standby state.

When the command is a data clearing command (YES at step #73), a card data area of the $E^2$PROM 53 is designated (step #74). and the data in the $E^2$PROM 53 are transmitted to the RAM 52 (step #75). Then an empty area code is preset (step #76) so that all of the sound data recording areas can be used. And "1" is added to the number of cleared times of the sound card, and the obtained number is inputted into the RAM 52 (step #77). This RAM data is recorded in the $E^2$PROM 53 (step #73). The program returns to the standby state.

Now, data inputting operation of instruments such as a camera or a playback means (described later) into which card data can be inputted through the communication with the sound card will be described with reference to FIG. 18. The microcomputer μC outputs a clock $\phi 2$ and a selecting signal CS (step #101 and #102), and further, transmits a card data inputting command (step #103). After waiting for a time required for the command judgment and the data preparation on the sound card side (step #104), the microcomputer μC inputs (reads) the card data through a serial communication (step #105). Thereafter, the clock $\phi 2$ and the selecting signal CS are reset (step #106). Further, when the instrument to be communicated with is a camera, an imprinting code is set according to the read out card data (empty areas, the card number, and the number of cleared times) (step #107).

The routine of recording sound data will be described with reference to FIG. 19. After outputting a clock $\phi 2$ and a selecting signal CS similarly to the above-mentioned (steps #111 and #112), a sound data recording command is transmitted (step #113). After waiting for a time (step #114), the sound data are outputted (step #115). After waiting a time required for writing the data in the E PROM 53 (step #116), similarly the characteristic data are outputted (step #117). Then after waiting for a time required for writing the data in the E PROM 53 (step #118), the clock $\phi 2$ and the selecting signal CS are reset (step #119).

Now, the routine for reading out the sound data will be described with reference to FIG. 20. Similarly to the above-mentioned, a clock $\phi 2$ and a selecting signal CS are outputted (steps #121 and #122), and a sound data reading command is transmitted (step #123). After waiting for a time (step #124), a data area code is transmitted (step #125). After waiting for a time (step #126), the sound data are inputted in the instrument (step #127), and the clock $\phi 2$ and the selecting signal CS are reset (step #128).

Figure 21:
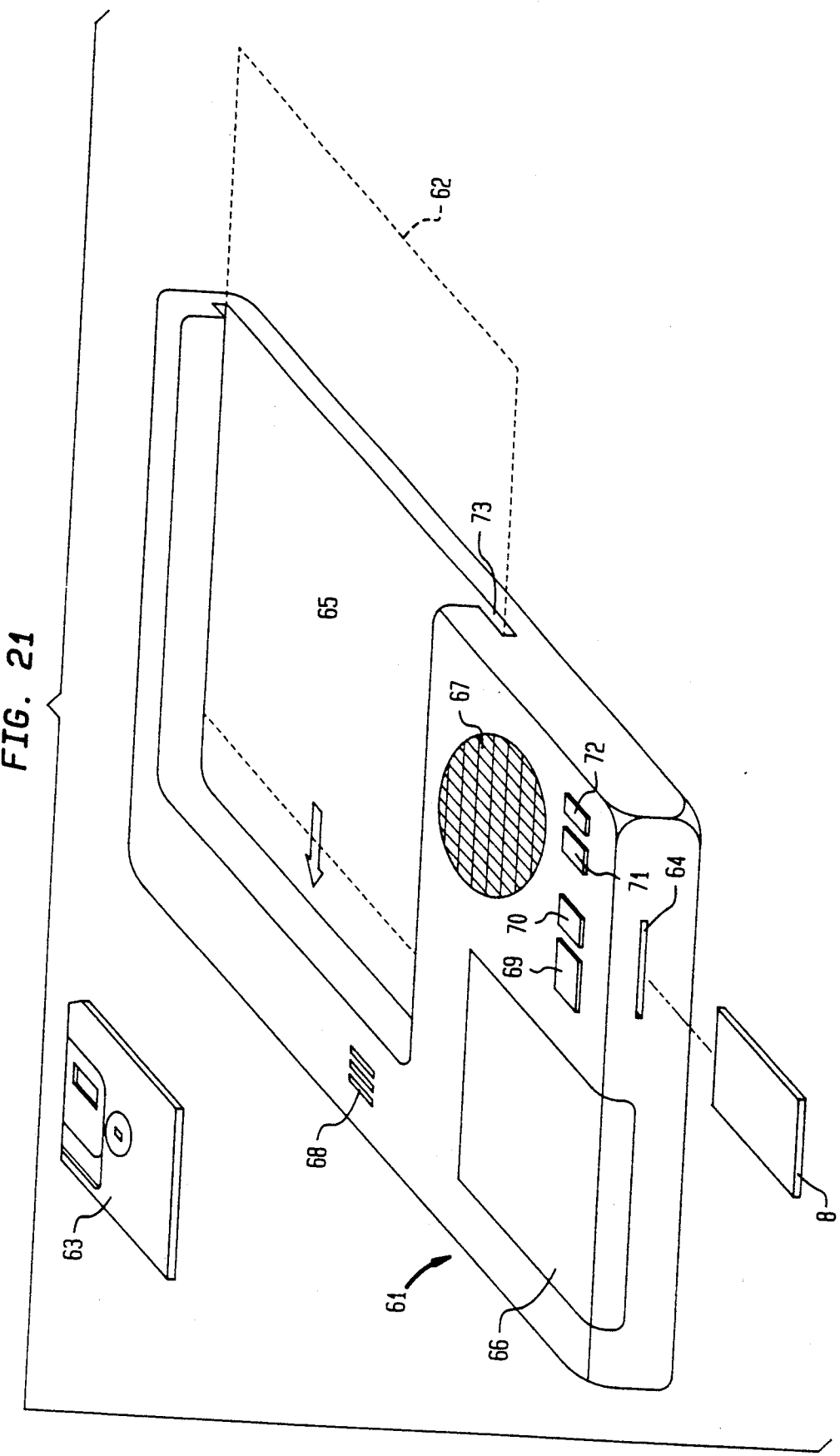
FIG. 21 is a perspective view of a sound playback apparatus.

Now, a sound playback apparatus will be described in the following with reference to FIG. 21. By attaching a sound card 8 in which sounds have been recorded or a magnetic disk 63 (recording means) in which data of the sound card 8 have been recorded and a print 62 (imprinted with a code) of a film to the sound playback apparatus 61, the apparatus plays back the sounds corresponding to photographed images in frames of the film. In the sound playback apparatus 61, there are provided a sound card attaching section 64, a print attaching section 65, a magnetic disk attaching section 66, a speaker 67, a microphone 68, a playback switch 69, a repeated playback switch 70, a copy switch 71 and a sound recording switch 72. The sound card attaching section 64 has contact points similar to the sound card attaching section described above with reference to FIGS. 13, 14(a) and 14(b). The print attaching section 65 has a print code reading part 73. The copy switch 71 is used for operating the function of transmitting sound data from the sound card 8 to the magnetic disk 63. The recording switch 72 is used for recording sounds through the microphone 68 directly into the magnetic disk 63 for after-recording.

When the print 62 is attached to the above-mentioned sound playback apparatus 61, the bar code of the print 62 is read by the print code reading part 73, and by pushing the playback switch 69, the corresponding sounds can be read and played back from the magnetic disk 63 in which those have been recorded. The sounds can be played back directly from the sound card 8. Further, in order to save the driving of the magnetic disk 63 at every sound playback time, sounds relating to one print are transmitted from the magnetic disk 63 and once stored to a semiconductor memory (contained in the sound playback apparatus 61), so that the sounds can be played back from the semiconductor memory by pushing the repeated playback switch 70.

Figure 22:
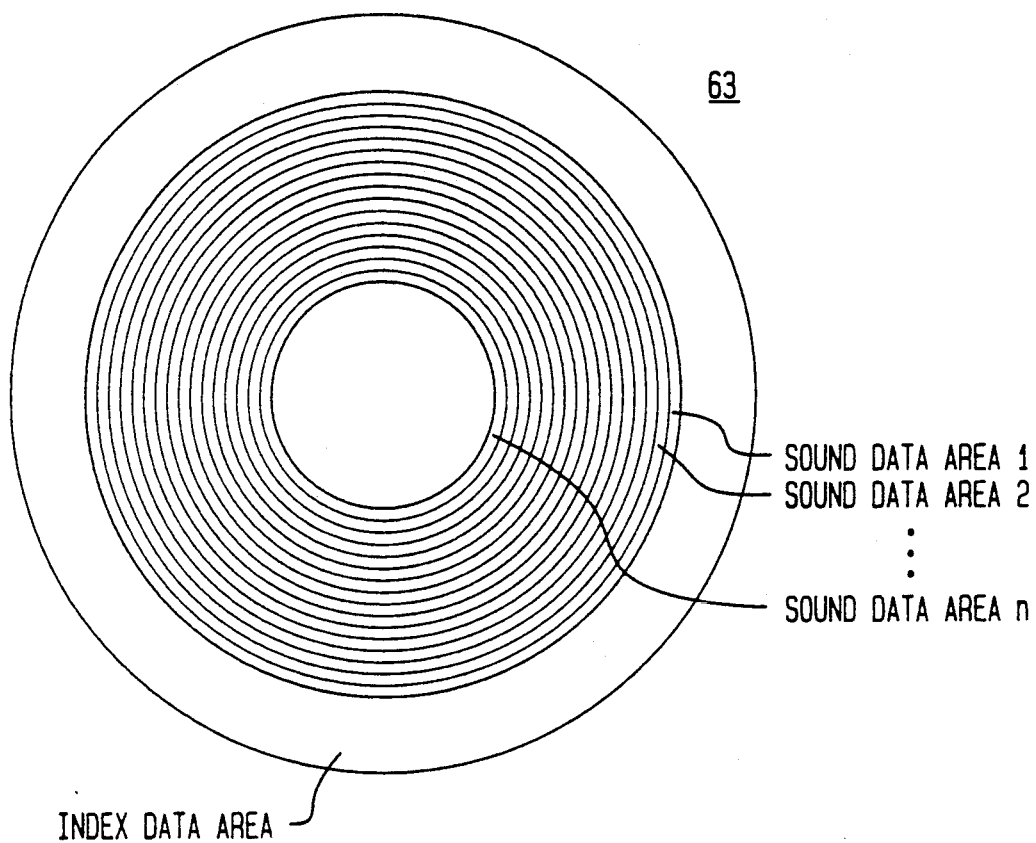
FIG. 22 is a structural view of a magnetic memory.

The data storing structure of the magnetic disk 63 is shown in FIG. 22. A index data area is provided in the outer circumferential part of the magnetic disk 63. And in the inner circumferential part, sound data areas 1,2 . . . n are provided from the outer part toward the inner part. In the index data area, data corresponding to the card data areas of the sound card memory shown in FIG. 16 are recorded. In the sound data areas 1,2 . . . n, data of the data areas are recorded. In each of the index data areas and the sound data areas, data of a plurality of sound cards can be recorded.

Figure 23:
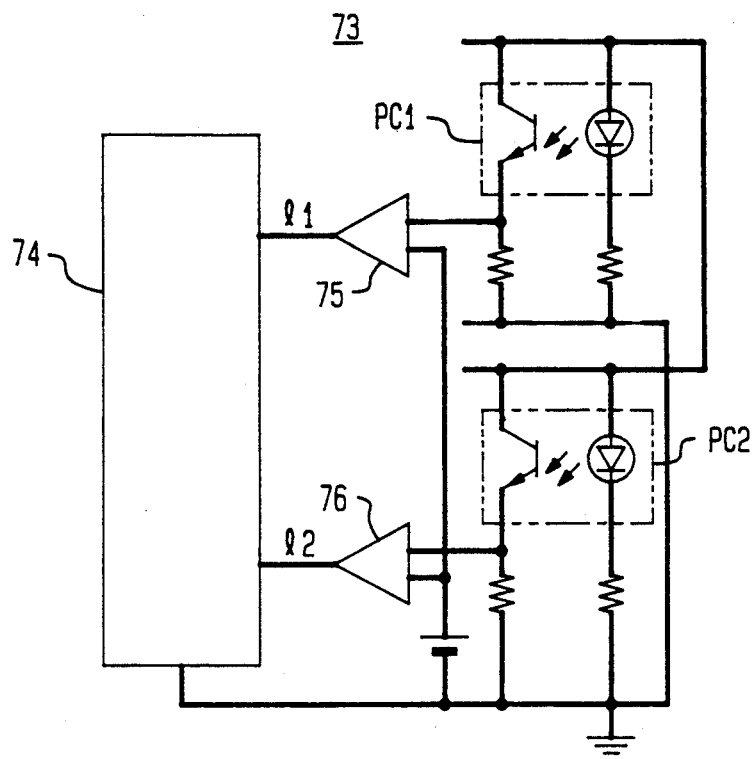
FIG. 23 is a structural view of a code reading section of the sound playback apparatus.
Figure 24:
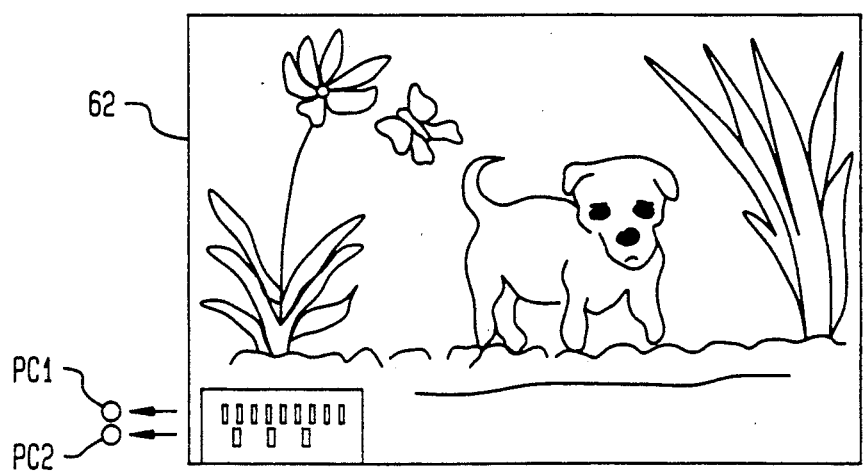
FIG. 24 is a view showing the relation between a print having a code and the code reading section.

Embodiments of the print code reading part 73 in the sound playback apparatus 61, and the print provided with a code are shown in FIGS. 23 and 24.

Figure 25:
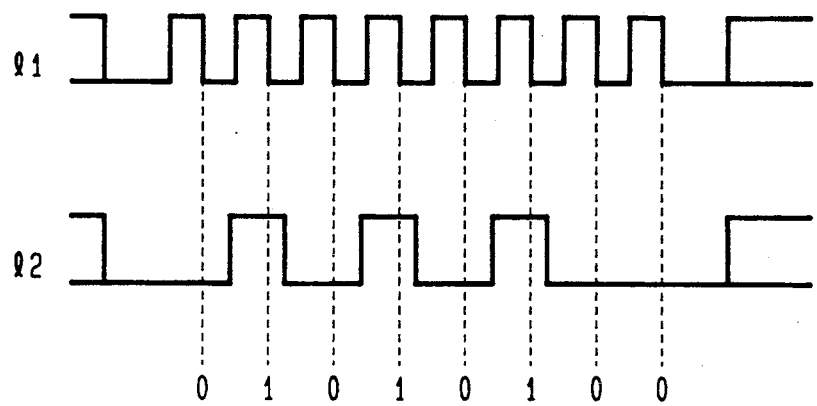
FIG. 25 is a view showing outputs of the code reading section.

The print code reading part 73 comprises a microcomputer 74 of the sound playback apparatus 61, photocouplers (comprising a LED and a phototransistor) PC1, PC2, comparators 75, 76 and the like. Lights from LEDs of the photocouplers PC1, PC2 are projected on code portions 77 of the print 62. When the phototransistor receives the light reflected by the code portion 77, the phototransistor is turned ON, the voltage level of the emitter being raised, outputs of comparators 76, 77 are turned over, and detecting outputs can be obtained on lines 11, 12. By reading the detecting outputs by means of the microcomputer 74, the code can be detected. As shown in FIG. 24, the photocoupler PC1 is provided for reading the clock of the code portion 77 and the photocoupler PC2 is provided for reading the code, and by moving the print 62 in the direction of the arrow, the outputs can be obtained on lines 11, 12 as shown in FIG. 25. The microcomputer 74 inputs the 12 output at the trailing edge of the 11 output.

The structure of the code reading part 73 is not limited to the above-mentioned embodiment. For example, the photocoupler may be moved instead of the print 62. Though two pairs of photocouplers are used in the above-mentioned embodiment, more photocouplers corresponding in number to the bits of the bar code may be provided so as to read the code at one time. Further, instead of photocouplers, a CCD may be used.

Figure 26:
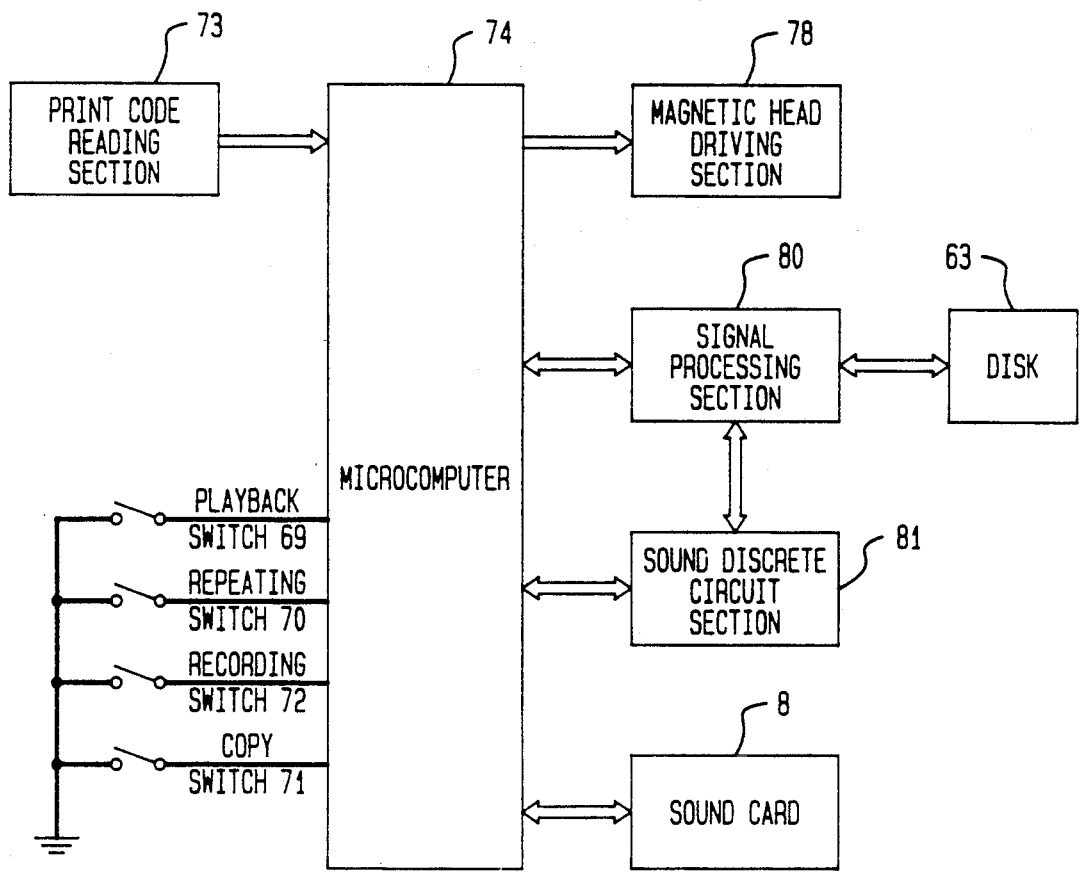
FIG. 26 is a circuit block diagram of the sound playback apparatus.

A circuit block diagram of the sound playback apparatus 61 is shown in FIG. 26. The sound playback apparatus 61 comprises a microcomputer 74 which communicates data with the attached sound card 8, the print code reading part 73 which gives signal to the microcomputer 74, various kinds of switches 69 to 72, a magnetic head driving section 78, a signal processing section 80 for processing signals between the attached magnetic disk 63 and the microcomputer 74, and a sound discrete circuit section 81.

Figure 27:
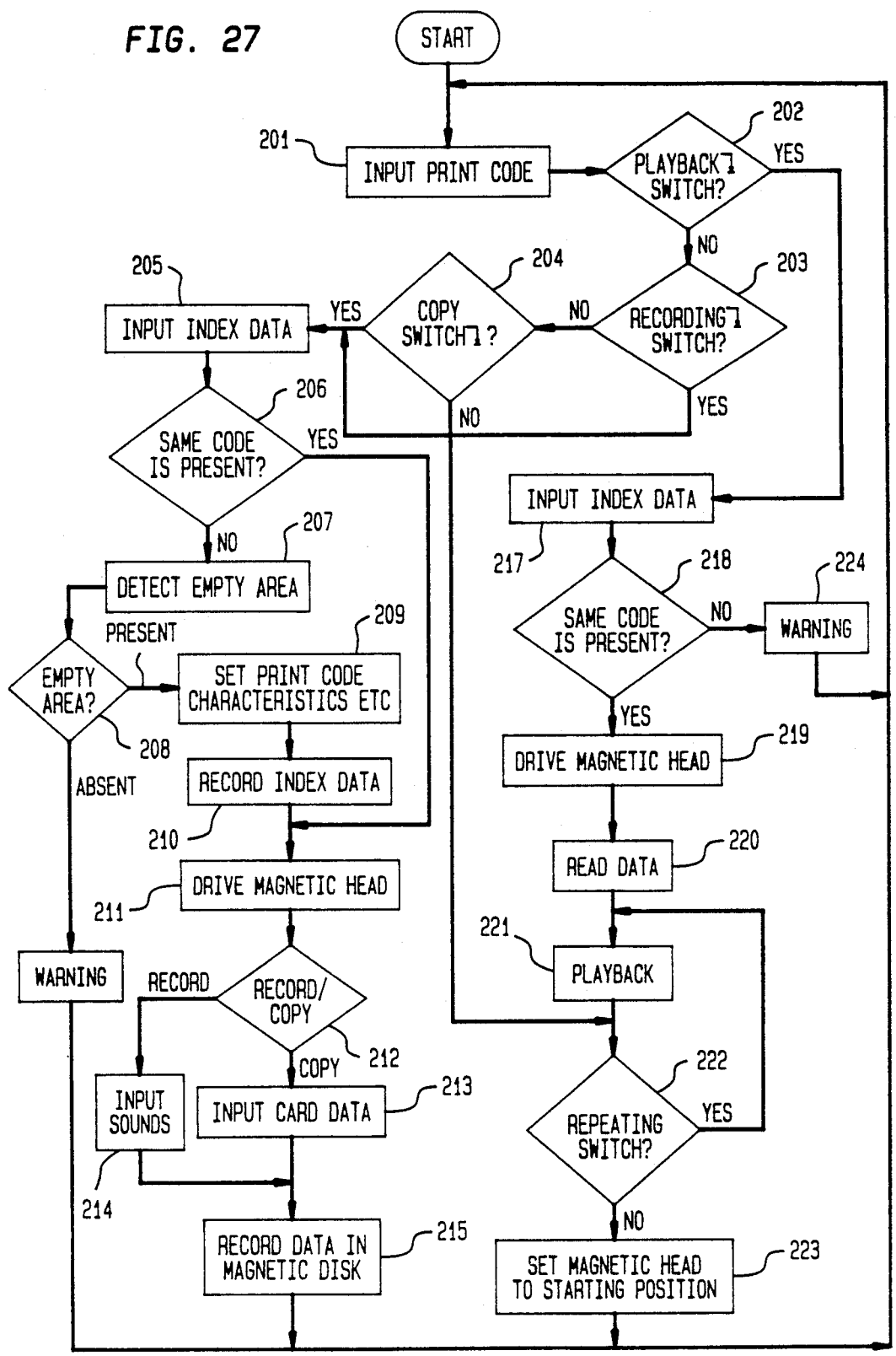
FIG. 27 is a flow chart showing operation of a microcomputer of the sound playback apparatus.

Operation of the microcomputer 74 of the sound playback apparatus 61 will be described in the following with reference to a flow chart of FIG. 27.

The print 62, the magnetic disk 63 and the sound card 8 are attached to the sound playback apparatus 61. By attaching the print 62, the print code is read out in the print code reading part 73 and inputted into the microcomputer 74 (step #201). Then, the signal inputs from the playback switch 69, the recording switch 72, and the copy switch 71 are successively checked (steps #202, #203 and #204). When the recording switch 72 or the copy switch 71 is closed, the program advances to step #205 and the following steps. At step #205, index data are inputted from the magnetic disk 63. The index data includes the card number, the number of cleared times, the frame address and characteristics data. When the index data have not been recorded in the magnetic disk 63, data inputting is not executed here. Then, it is judged whether there are data corresponding to the read out print code in the index data (step #206). When the index data have not been recorded in the magnetic disk 63 and when the same code is not present, it is judged whether there is any empty area for newly recording data therein or not (steps #207 and #208). When there is an empty area, the data in the card data area of the sound card 8 are set (step #209), and the data are recorded as the index data in the magnetic disk (step #210).

Thereafter, the magnetic head is moved to the corresponding sound data area according to the print code and the index data (step #211). Then it is judged which is selected, recording or copying (step #212). When copying is selected, the sound data in the data area of the sound card 8 are inputted into the semiconductor memory (step #213), and recorded in the magnetic disk 63 (step #215), then the program returning.

On the other hand, when recording is selected, sounds from the microphone 68 are inputted into the semiconductor memory (step #214), and the program advances to the above-mentioned step #215. When there is no empty area at step #208, a warning is given (step #216), the program returning. Further, when data have been already recorded in the magnetic disk 63, the microcomputer 74 reads the index data in the magnetic disk 63 at step #205, and when the data corresponding to the read out print code are present in the index data at step #206, the program advances to step #211 without executing steps #207 to #210.

When the playback switch 69 is closed, the program advances to step #217 and the following steps. Firstly, the index data are inputted as above-mentioned (step #217), and then it is judged whether the code corresponding to the print code is present or not (step #218). When the same code is present, the magnetic head is moved to the corresponding data area of the magnetic disk 63 (step #219), and the data are read and recorded in the semiconductor memory (step #220). Then sound playback is executed (step #221). Thereafter, when the repeating switch 70 is closed (YES at step #222), sound playback is executed again. After the sound playback is completed and when no switch is operated, the magnetic head is returned to the index data area which is the starting position (step #223). Then the program returns. Further, when the same code is not present at step #218, a warning is given (step #224), and the program returns. Further, when no switch is operated after step #201, the program advances from step #204 to step #222.

Figure 28:
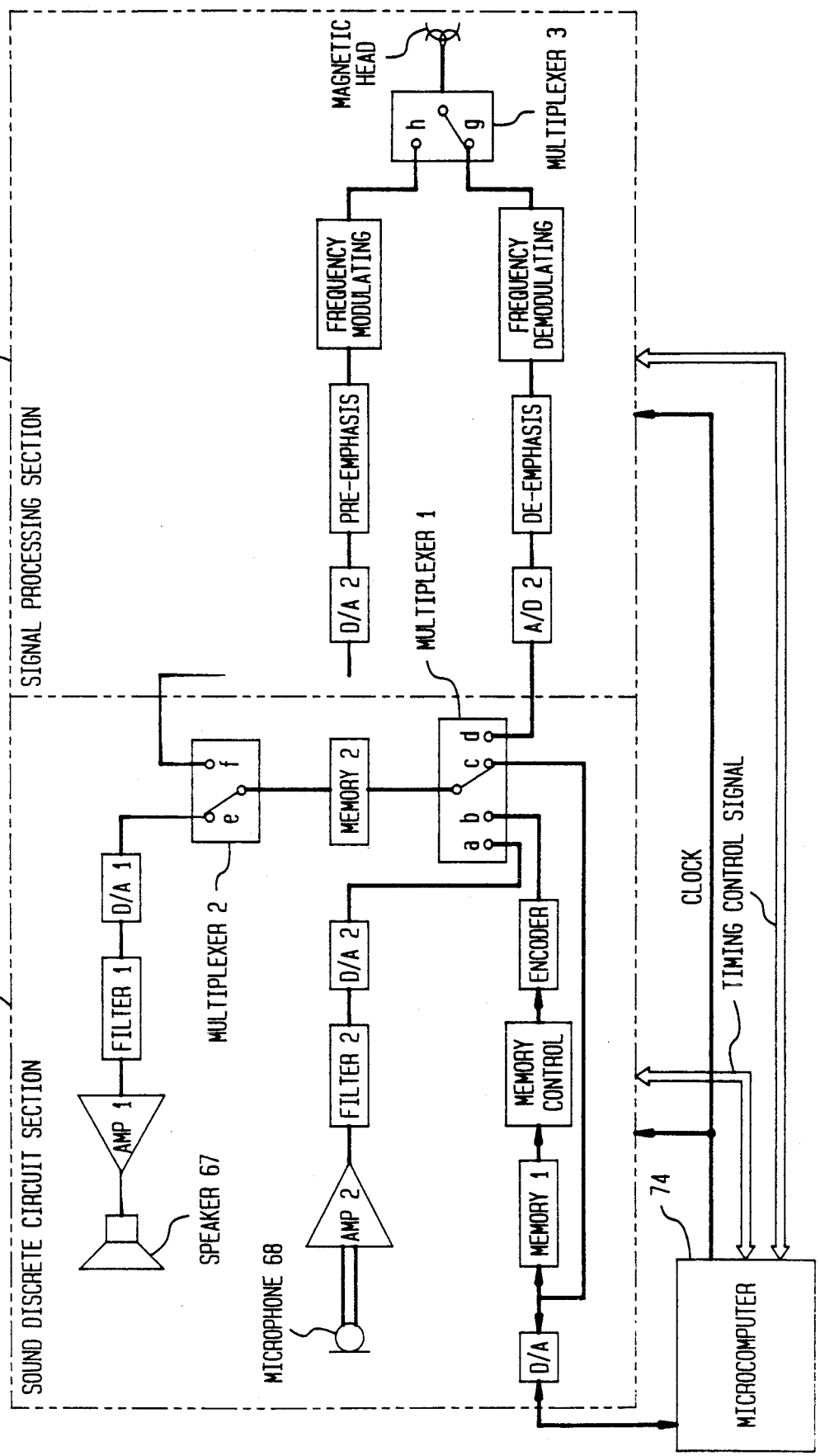
FIG. 28 is a circuit block diagram of the sound playback apparatus.

Now, a structural embodiment of the circuit block of the signal processing section 80 and the sound discrete circuit section 81 in the sound playback apparatus 61 will be described with reference to FIG. 28.

The signal processing section 80 includes a pre-emphasis and de-emphasis circuits, a frequency modulating circuit, a frequency demodulating circuit, a multiplexer 3, a magnetic head and the like. The sound discrete circuit section 81 includes a speaker 67, a microphone 68, memories 1,2, multiplexers 1,2 and the like. These are all operated by control signals outputted from the microcomputer 74.

In this circuit block, index data are recorded in the following manner.

(1) The multiplexers 1,2,3, are changed over to the contact point c,f,h sides respectively.

(2) The magnetic head is driven to the index data area.

(3) Index data are stored in the memory 2 according to the data from the sound memory.

(4) The data in the memory 2 is processed in the D/A circuit and thereafter they are stored in the magnetic disk by the head.

Further, index data are read in the following manner.

(1) The multiplexers 1,3 are changed over to the contact point d,g sides respectively.

(2) The magnetic head is driven to the index data area.

(3) Data in the magnetic disk are read by the magnetic head, A/D converted and stored in the memory 2.

(4) The multiplexer 1 is changed over to the contact point c side.

(5) The data in the memory 2 are read through I/O interface I/O.

Sound recording is executed in the following manner.

(1) The multiplexers 1,2,3 are changed over to the contact point a,f,h sides respectively.

(2) A signal obtained from the microphone 68 through an amplifier 2 and a filter 2 is converted to digital signals by A/D converter A/D1.

(3) The obtained digital signal is once stored in the memory 2.

(4) The sound digital signal in the memory 2 is converted to analogue signals by the D/A2. The reason why the signal is D/A converted after the above-mentioned A/D conversion is to time-compress them. The A/D conversion is executed at every usual sound sampling frequency. If a frequency; ten times as that of the A/D conversion is used in the D/A conversion, time of the analogue signal after the D/A conversion is ten times as that of the compressed digital signal.

(5) The D/A converted signal is processed through the pre-emphasis circuit, the frequency modulating circuit and the like, and recorded in the magnetic disk 63 by the magnetic head.

(6) The position of the magnetic head is controlled by a magnetic head driving section 78 so as to get access to an area determined by the preliminarily read index data and the print code.

Further, sound playback is executed in the following manner.

(1) The multiplexers 1,2,3 are changed over to the contact point d,e,g sides respectively.

(2) BY receiving a signal from the print code reading part 73 and the index code, the address position in the memory of the magnetic disk 63 is set.

(3) The signal read by the magnetic head is transmitted through the frequency modulating circuit, the de-emphasis circuit and the like to the A/D converter A/D2 and converter A/D2 and converted to a digital signal (4) The obtained digital signal is once stored in the memory 2. In the memory 2, all the sound data corresponding to the designated print codes are recorded.

(5) The data in the memory 2 are D/A converted again by the D/A converter D/A1. Thereby, the recorded sound signal is time-expanded. The frequency used at this time is determined according to characteristic data in the index data.

(6) The sounds are played back through the filter 1 and the amplifier 1 from the speaker 67.

Further, sound copying is executed in the following manner.

(1) The multiplexers 1,2,3 are changed over to the contact point b,f,h sides respectively.

(2) Data read from the sound card 8 are transmitted from the microcomputer 74 to the memory 1, and temporarily stored in the memory 1.

(3) The data are in the compressed state. Therefore, the data are expanded by an encoder, and stored in the memory 2.

(4) According to the preliminarily read print code and the index code, the magnetic head is moved to the address of the magnetic disk 63 in which the sounds are copied.

(5) The following operations are similar to those of the above-mentioned sound recording.

Figure 29:
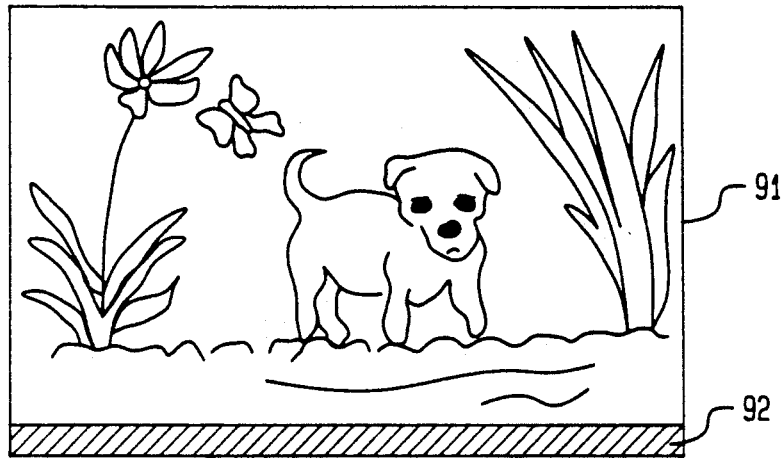
FIG. 29 is a flow view of a print having a magnetic memory.
Figure 30A:
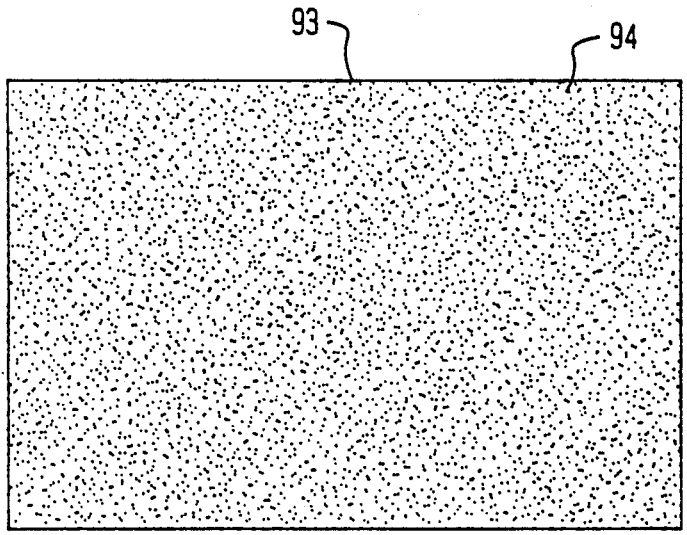
FIGS. 30(a) and 30(b) are a front view and a side view showing other embodiments of a print having a magnetic memory.
Figure 30B:
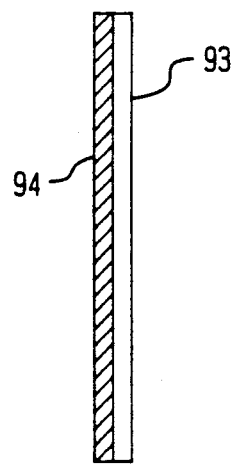

Now, further embodiments of a print will be described in the following with reference to FIGS. 29, 30(a) and 30(b). In the above-mentioned embodiment of a print shown in FIG. 24, a bar code is imprinted in the print, and sounds are recorded (copied) in the sound card or in the magnetic disk of which data is recorded from the sound card. However, as shown in FIGS. 29, 30(a) and 30(b), a magnetic tape 92 in which sounds are recorded may be adhered to a print 91, or a magnetic material (a magnetic memory) for recording sounds may be coated on the back surface of a print 93. Further, a magnetic material may be coated between the image forming surface of a print and the print base sheet, or a magnetic tape may be adhered to the back surface of a print.

In these systems, input and output of sounds can be executed similarly to the case of the magnetic disk. In these systems, the print per se has sound data and therefore another medium such as a magnetic disk is not required, which is very convenient when a print is used as a present.

Now, a flow of obtaining such prints used in the above-mentioned various systems and embodiment in use of such prints will be described in the following with reference to FIG. 31.

Firstly, as a first route (shown by arrow 1), a user (consumer) brings only a film 21 photographed by a camera 1 to a photofinisher (a photo processing shop or a photo laboratory). The photofinisher develops and prints the film 21 and makes a print 62 provided with a code. The user receives this print 62, and sets a sound card 8 and the print 62 on the sound playback apparatus 61, so that the sounds can be played back. In FIG. 31, the code reading part 73' is separated from the sound playback apparatus 61. Further, if data of the sound card 8 are copied and recorded in another medium such as the magnetic disk 63, the sounds can be played back by setting the medium and the print 62 on the sound playback apparatus 61. Furthermore, comments and the like can be additionally recorded.

As a second route (shown by arrow 2), a user brings a film 21 and a sound card 8 to the photofinisher. The photofinisher develops and prints the film 21 and obtains a print 91. At the same time, the photofinisher records the data preliminarily copied from the sound card 8 into a magnetic tape 92. Then the photofinisher adheres the magnetic tape 92 onto the print 91, and returns the same to the user. The user sets the print 91 in the sound playback apparatus 61', so that the sounds can be played back. Further, the sound playback apparatus 61' has a magnetic head thereinside, so that not only sound playback but also sound recording can be executed.

The above-mentioned print obtained by the first route is suitable for being arranged in a photo album. And the print obtained by the second route is suitable for being used as a present. In the above-mentioned embodiments, a user copies and records sounds in the magnetic disk 63, and the photofinisher copies and records sounds in the magnetic tape 92. However, these sound copying operations may be executed either of the user and the photofinisher. For example, such a system can be realized that the photofinisher makes a print 93 provided with a magnetic memory 94 as shown in FIG. 30(a) or 30(b) and returns to the user, and the user records data of the sound card 8 in the magnetic memory 94.

Furthermore, a memory means for recording data for corresponding a frame of a photographed film to an area in which sound data relating to the frame are stored is not limited to a film as above-mentioned. If a recording medium (memory) is provided on a film cartridge, the corresponding data can be recorded in the recording medium. A recording means used in this case may be an electronic or magnetic means. Further, in this case, a print obtained by developing and printing a film and the data storing area in the memory of the cartridge are put into correspondence. Therefore, at the time of printing a film at a photo processing shop, data read from the memory of the cartridge may be imprinted into the print or printed on the back surface of the print or in the corner of the print.

What is claimed is:

1. A sound playback apparatus comprising:

a sound recording medium attaching section to which a sound recording medium is to be attached, said sound recording medium having a plurality of recording areas and wherein said sound recording medium is capable of recording sound data in each of said recording areas;

an image recording medium attaching section to which an image recording medium is to be attached, said image recording medium having codes indicating the sound recording areas and wherein the image recording medium records photographed images;

reading means for reading said codes of the image recording medium;

detecting means for detecting recording areas in the sound recording medium corresponding to said codes read by the reading means; and playback means for playing back sound data corresponding to the recording areas detected by the detecting means.

* * * * *